United States Patent
Shen et al.

(10) Patent No.: US 10,911,899 B2
(45) Date of Patent: Feb. 2, 2021

(54) PROVIDING INDICATION TO LOCATION OF PHYSICAL OBJECT USING WIRELESS TAG

(71) Applicant: Adero, Inc., Goleta, CA (US)

(72) Inventors: Jack J. Shen, Goleta, CA (US); Jeremiah Prousalis, Santa Barbara, CA (US); Kristen Johansen, Santa Barbara, CA (US); Adrian Yanes, Santa Barbara, CA (US); Nathan Kelly, Santa Barbara, CA (US)

(73) Assignee: Adero, Inc., Goleta, CA (US)

( * ) Notice: Subject to any disclaimer, the term of this patent is extended or adjusted under 35 U.S.C. 154(b) by 24 days.

(21) Appl. No.: 16/183,092

(22) Filed: Nov. 7, 2018

(65) Prior Publication Data

US 2020/0143123 A1     May 7, 2020

(51) Int. Cl.
*H04W 4/029* (2018.01)
*G06K 7/10* (2006.01)

(52) U.S. Cl.
CPC ........ *H04W 4/029* (2018.02); *G06K 7/10366* (2013.01)

(58) Field of Classification Search
None
See application file for complete search history.

(56) References Cited

U.S. PATENT DOCUMENTS

| | | | |
|---|---|---|---|
| 5,892,441 A * | 4/1999 | Woolley | G01S 5/0289 340/539.26 |
| 6,717,516 B2 * | 4/2004 | Bridgelall | G01S 5/0009 340/505 |
| 6,745,027 B2 * | 6/2004 | Twitchell, Jr. | G06K 17/0029 455/422.1 |
| 7,009,519 B2 | 3/2006 | Leonard et al. | |
| 7,644,261 B2 | 1/2010 | Hsieh | |
| 7,646,292 B2 * | 1/2010 | Johnson | G06K 7/0008 340/505 |
| 8,094,012 B1 * | 1/2012 | Tran | G01S 11/16 340/539.13 |
| 8,373,562 B1 | 2/2013 | Heinze et al. | |
| 8,872,655 B2 * | 10/2014 | Buller | G08B 13/1427 340/539.32 |

(Continued)

OTHER PUBLICATIONS

International Search Report and Written Opinion for Application No. PCT/US2019/052774; dated Dec. 12, 2019, 8 pages.

(Continued)

*Primary Examiner* — Christle I Marshall
(74) *Attorney, Agent, or Firm* — Brake Hughes Bellermann LLP

(57) ABSTRACT

A method includes: sending, by a first processing device, a first message including an instruction to a first tag to collect first data from at least one device, the first tag coupled to a first physical object for organizing the first physical object; receiving, by the first processing device, a second message from the first tag, the second message including the first data; obtaining, by the first processing device, a first descriptor as being associated with the first data; and presenting, by the first processing device, at least the first descriptor to a user as an indication to a location of the first physical object.

20 Claims, 10 Drawing Sheets

(56) References Cited

U.S. PATENT DOCUMENTS

| | | | |
|---|---|---|---|
| 8,981,938 B2* | 3/2015 | Kazerouni | G08B 13/1427 340/572.1 |
| 9,357,348 B2* | 5/2016 | Evans | H04W 4/023 |
| 10,051,600 B1 | 8/2018 | Zhong et al. | |
| 10,373,463 B1 | 8/2019 | Herring | |
| 10,448,211 B1 | 10/2019 | Shen et al. | |
| 10,520,580 B2* | 12/2019 | Nossik | G01S 5/0284 |
| 2006/0109037 A1 | 5/2006 | Hsu | |
| 2006/0192653 A1 | 8/2006 | Atkinson et al. | |
| 2010/0060452 A1 | 3/2010 | Schuster et al. | |
| 2014/0173439 A1 | 6/2014 | Gutierrez et al. | |
| 2014/0368334 A1 | 12/2014 | Tian et al. | |
| 2015/0126234 A1 | 5/2015 | Rodriguez | |
| 2015/0128733 A1 | 5/2015 | Taylor et al. | |
| 2016/0231372 A1 | 8/2016 | Wootton et al. | |
| 2016/0260301 A1 | 9/2016 | Miller et al. | |
| 2016/0364682 A1* | 12/2016 | Jones | G06Q 10/087 |
| 2017/0093982 A1 | 3/2017 | Shaashua et al. | |
| 2018/0039934 A1 | 2/2018 | Mulaosmanovic et al. | |
| 2018/0091138 A1 | 3/2018 | Greither et al. | |
| 2018/0123804 A1 | 5/2018 | Smith et al. | |
| 2018/0225951 A1 | 8/2018 | De Barros Chapiewski et al. | |
| 2019/0058591 A1 | 2/2019 | Sharpe et al. | |
| 2019/0096209 A1 | 3/2019 | Chen et al. | |
| 2020/0092683 A1* | 3/2020 | Fyfe | H04L 69/18 |

OTHER PUBLICATIONS

International Search Report and Written Opinion for Application No. PCT/US2019/052776, dated Oct. 29, 2019, 6 pages.

International Search Report and Written Opinion for Application No. PCT/US2019/052777, dated Dec. 12, 2019, 9 pages.

International Search Report and Written Opinion for PCT Application No. PCT/US2020/070490, dated Nov. 20, 2020, 9 pages.

\* cited by examiner

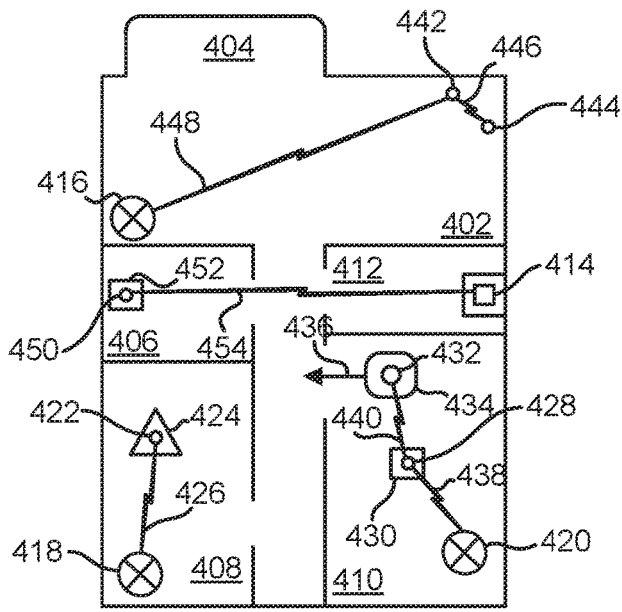
FIG. 4
FIG. 5
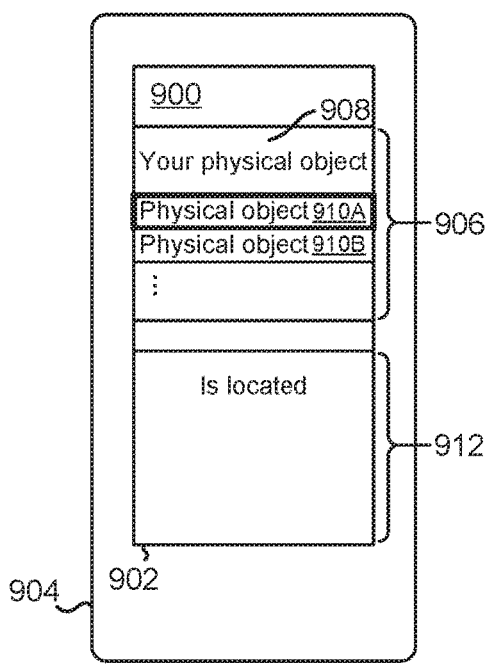
FIG. 9A
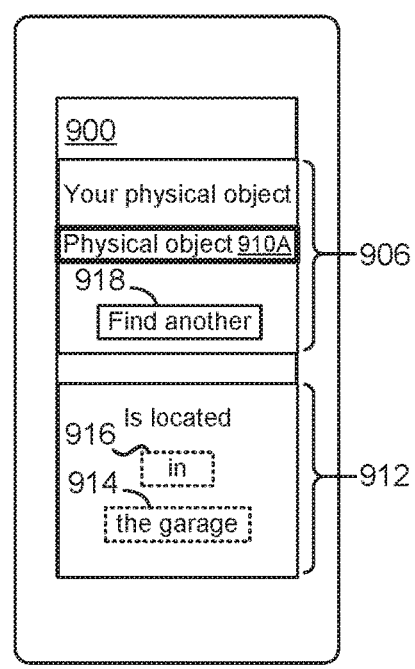
FIG. 9B

FIG. 13         1300

PROVIDING INDICATION TO LOCATION OF PHYSICAL OBJECT USING WIRELESS TAG

CROSS-REFERENCE TO RELATED APPLICATIONS

This patent application relates to the following patent applications filed concurrently herewith ("the related patent applications"):

U.S. patent application Ser. No. 16/183,079, filed Nov. 7, 2018, and entitled "Organizing physical objects using wireless tags."

U.S. patent application Ser. No. 16/183,087, filed Nov. 7, 2018, and entitled "Organizing groups of physical objects using wireless tags."

U.S. patent application Ser. No. 16/183,097, filed Nov. 7, 2018, and entitled "Tag for wirelessly organizing a physical object."

Each one of the related patent applications is incorporated herein by reference in its entirety.

TECHNICAL FIELD

This document relates, generally, to organizing physical objects using wireless tags.

BACKGROUND

With physical objects that are portable or movable, a user may forget where he or she placed the object, or may unknowingly lose the object. Searching for misplaced or lost physical objects may be inconvenient and inefficient.

SUMMARY

In a first aspect, a method includes: sending, by a first processing device, a first message including an instruction to a first tag to collect first data from at least one device, the first tag coupled to a first physical object for organizing the first physical object; receiving, by the first processing device, a second message from the first tag, the second message including the first data; obtaining, by the first processing device, a first descriptor as being associated with the first data; and presenting, by the first processing device, at least the first descriptor to a user as an indication to a location of the first physical object.

Implementations can include any or all of the following features. Second data is collected from multiple devices by the first tag, the method further comprising selecting, by the first processing device, the first data from the second data. The first processing device selects the first data from the second data based on a proximity measure relating to the first tag. Obtaining the first descriptor comprises: providing, by the first processing device, a request message including the first data to a second processing device coupled to the at least one device; and receiving, by the first processing device and from the second processing device, a response message including the first descriptor in response to the request message. The device includes a second tag. The device includes a smart lightbulb. The method further comprises: sending, by the first processing device and to a second processing device coupled to the at least one device, a request message regarding a second tag that is out of range of the first processing device, the second tag coupled to a second physical object for organizing the second physical object; receiving, by the first processing device, a response message including a second descriptor from the second processing device in response to the request message; and presenting, by the first processing device, the second descriptor to the user as an indication to a location of the second physical object. Multiple descriptors are presented to a user as the indication to the location of the first physical object.

In a second aspect, a method includes: receiving, by a tag, a first message including an instruction from a processing device to collect first data from at least one device, the tag coupled to a physical object for organizing the physical object; collecting, by the tag, the first data from the device; and sending, by the tag, a second message including the first data to the processing device in response to the instruction.

Implementations can include any or all of the following features. Second data is collected from multiple devices by the tag, the method further comprising selecting, by the tag, the first data from the second data. The tag selects the first data based on a proximity measure relating to the tag.

In a third aspect, a method includes: receiving, in a first processing device, a first message including first data sent by a first device coupled to the first processing device, the first device having collected the first data from a first tag that is coupled to a first physical object for organizing the first physical object; identifying, by the first processing device, a first descriptor associated with the first device; and providing, by the first processing device, a second message including the first descriptor to a second processing device configured for presenting the first descriptor to a user as an indication to a location of the first physical object.

Implementations can include any or all of the following features. Each of multiple devices coupled to the first processing device, including the first device, send respective first messages including the first data to the first processing device, the method further comprising identifying, by the first processing device, at least one of the multiple devices to be associated with the first data. The first processing device identifies the at least one of the multiple devices based on a proximity measure relating to the first tag. Providing the first descriptor comprises: receiving, by the first processing device, a request from the second processing device; and sending, by the first processing device, the first descriptor to the second processing device in response to the request. The first device comprises a second tag. The first device comprises a smart lightbulb. The method further comprises: receiving, by the first processing device, a third message including a request from the second processing device including second data that the second processing device obtains from a second tag that is coupled to a second physical object for organizing the second physical object, the second tag obtaining the second data from a second device that is coupled to the first processing device; identifying, by the first processing device, a second descriptor associated with the second data; and sending, by the first processing device, a fourth message including the second descriptor to the second processing device in response to the request.

In a fourth aspect, a computer program product stored in a non-transitory medium includes instructions that when executed cause a processor to generate a graphical user interface comprising: a tag area having at least one input control configured for a user to select a tag to be located, the tag coupled to a first physical object for organizing the physical object; and a descriptor area configured to present a descriptor having been obtained using data obtained from the tag, the descriptor presented as an indication to locating the physical object.

Implementations can include any or all of the following features. The data identifies a device and is collected by the tag from the device.

BRIEF DESCRIPTION OF DRAWINGS

FIG. 4 schematically shows a layout of a building in which a system can organize physical items.

FIG. 5 shows an example of a system that can provide an indication to a location of a physical object.

FIGS. 9A-B show examples of a graphical user interface (GUI) that can be used for providing an indication to a location of a physical object.

Like reference symbols in the various drawings indicate like elements.

DETAILED DESCRIPTION

Figure 1:
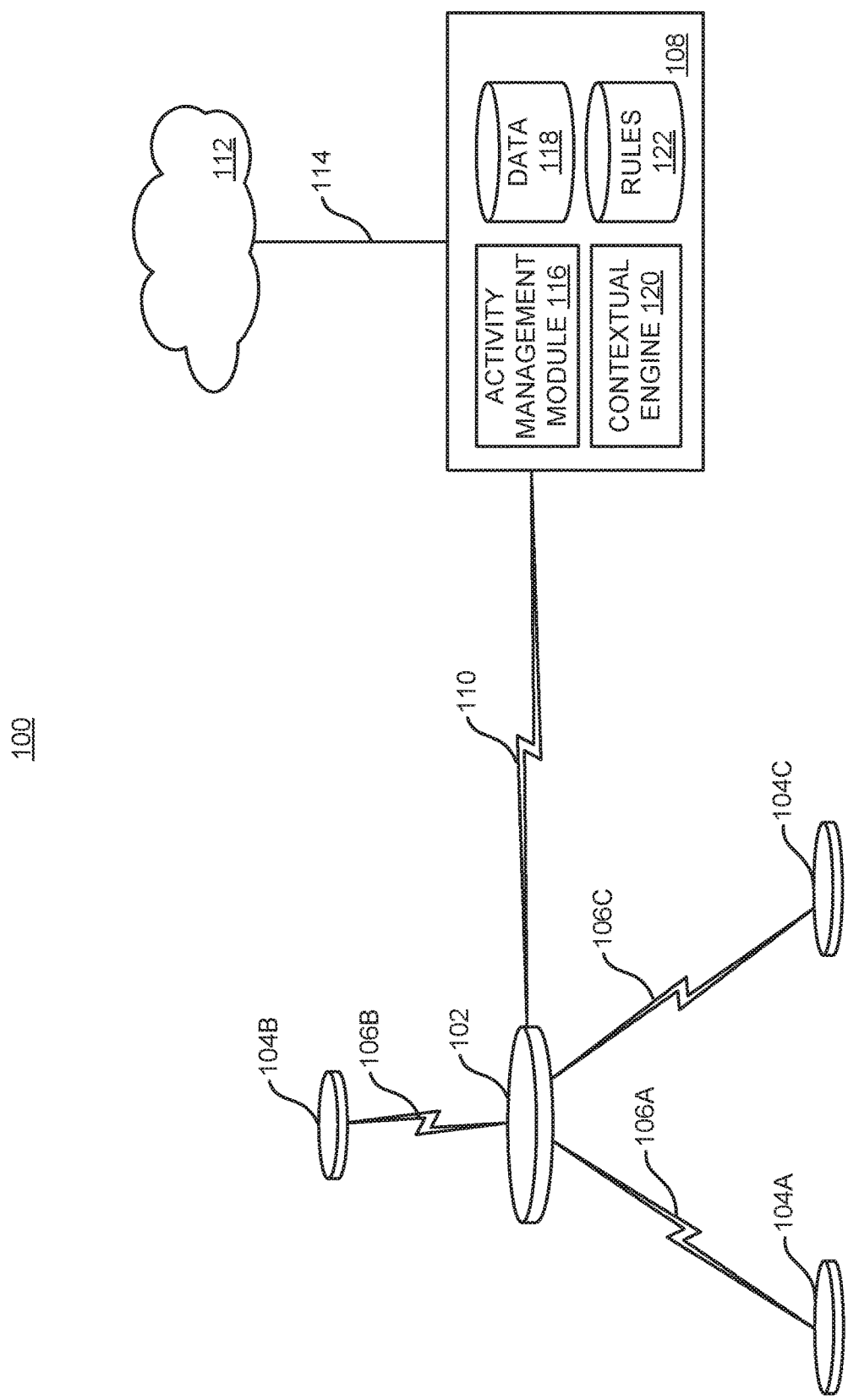
FIG. 1 schematically shows an example operating environment in which a system can track physical items.

This document describes examples of systems and techniques that allow for intelligently providing one or more indications to the location of a physical object using a wireless tag. A wireless device can serve as a point of reference to facilitate the system providing one or more indications to a user as to the location of a physical object. In some implementations, the indication(s) may include one or more portions of information that at least partially or approximately define the location of the physical object so that the user can utilize the indication(s) as a starting point for a more direct or targeted search for the physical object. For example, one or more of the indications may includes a hint, a clue, a reference point, a name of an object, a name of a location, a name of an area, metadata about a device (e.g., a tag, processing device, and/or an IoT device), or a name of a person, or combinations thereof. Data can be collected from the wireless device and used to elevate the context of the present surroundings of the physical object to a level that is intelligible and useful to the user. Such wireless device can include, but is not limited to, another tag, an IoT device (e.g., a smart lightbulb or a home voice assistant), a processing device (e.g., a smartphone or tablet device), a personal digital assistant, a computer (e.g., a laptop or a desktop), or a dedicated standalone component, sometimes referred to as a hub. The indication can identify to the user one or more locations, objects, and/or persons having been determined as currently being proximate the physical object. With the indication (s) having at least sufficient specificity (e.g., by stating that the physical object "is in the garage" or "is in the toolbox within the garage"), this allows the user to tailor his or her search in a meaningful way to more efficiently find the item. With the indication (s) being particularly specific (e.g., by stating that the physical object "is in the top kitchen drawer"), the user may be able to find the physical object almost instantaneously. In some implementations, a relative rather than absolute position for a physical object may be indicated. For example, the indication to a location may not be given in terms of coordinates or placement on a map, but rather by the thing(s), area(s), and/or person(s) that are currently nearby the physical object.

The present disclosure describes examples of a technology platform that can counteract the complexity often observed in IoT proliferation and can be used for optimization and cross communication of these and/or other smart devices. In some implementations, a foundational technology platform/stack can be designed to counteract the complexity of IoT proliferation and harness the power of shared information. For example, item-level data can be securely gathered and shared across all the smart things in an environment (as a baseline system-level understanding) so as to create an intelligent, contextually aware environment. In such an intelligent environment, connected devices can serve as essentially intelligent systems, sharing a unified contextual understanding to inform decisions. In some implementations, such decisions could be singular, group-based, or collective in nature. In the context of such a platform, a range of seamless, end-to-end solutions can be created that solve larger, more challenging customer problems and drive greater benefits and returns on IoT investments.

As used herein, a tag is a wireless device with processing capability and configured to be attached to, embedded in, or otherwise coupled to a physical object to facilitate organizing or tracking of at least the presence, proximity, and movement of that physical object. The tag can include a wireless communication component that serves to transmit data packets over wireless (e.g., radio) signals from time to time (e.g., as a beacon), or to receive data packets over the signal(s) from another tag and/or from a processing device.

A platform may include multiple tags configured for being attached to, embedded within, or otherwise coupled to respective physical objects. Some tags can be configured to a logical structure such as a grouping or a structural hierarchy wherein one or more tags serve as a "parent tag" to one or more other tags which can be referred to as "child tags". As used herein, a tag is considered a parent tag if it controls the organizing of at least one other tag. As used herein, a tag is a child tag if the organizing of the tag is controlled by at least one other tag. The child tag can have the same or a different (e.g., less complex) configuration of hardware and/or software (e.g., operating system, applications, firmware, etc.) than the parent tag. A processing device can serve to connect with multiple tags (e.g., parent tags), react to information received from them, and issue queries, requests, or other commands to the tags. For example, the processing device may at least in part be implemented in the form of a smartphone and/or tablet executing a particular application or operating system. As another example, the processing device may at least in part be implemented in the form of a dedicated stand-alone device (sometimes referred to as a "hub" in the system). As another example, the processing device may at least in part be implemented in the form of one or more remote processing devices (e.g., a cloud solution). In some implementations, an intelligence engine can be implemented on one or more processing devices in the cloud. For example, the intelligence engine may contextualize one or more activities with external factors such as time of day, nature of interaction, location of interaction, weather and external conditions, and/or permissions and relationships between entities (e.g., tags, physical objects, and/or persons) to create experiences that leverage the collective understanding of the system.

FIG. 1 schematically shows an example operating environment in which a system 100 can track physical items. The system 100 can be used with one or more other examples described elsewhere herein. The system 100 can be implemented using one or more examples described herein with reference to FIG. 15.

The system 100 includes at least one tag 102 and/or at least one tag 104A-C. In some implementations, multiple instances (i.e., a plurality) of the tag 102 can be used, and here only one instance of the tag 102 is shown for simplicity. The tags 102 and 104A-C can be configured to be attached to, mounted on, or otherwise coupled to, respective physical objects which are not shown for simplicity. For example, the tag 102 may be attached to a sports bag and tags 104A-C may be attached to a baseball glove, a baseball cap, and a bat, respectively. Communication between the tag 102 and one or more of the tags 104A-C may occur by way of sending data packets over respective wireless signals 106A-C. In some implementations, the wireless signals 106A-C include beacon signals and the tag 102 is configured for receiving and recognizing the wireless signals 106A-C. For example, the tag 102 can be considered a parent tag with regard to one or more of the tags 104A-C. As another example, one or more of the tags 104A-C can be considered a child tag with regard to the tag 102. In some implementations, at least one instance of the tag 102 can serve as a child tag to another instance of the tag 102. In some implementations, at least one instance of the tag 104A can serve as a child tag to another instance of the tag 104A. In this example, the tag 102 can be considered to be at a first level of a hierarchy (e.g., as a parent tag), and the tags 104A-C can be considered to be at a second level of the hierarchy (e.g., as child tags). In some implementations, more levels than two can be used in a hierarchy.

For example, each of the tags 104A-C can be assigned to an item that a person carries in their purse to serve as a tracker for that item, and the tag 102 can be defined to correspond to the purse itself, to facilitate organizing and performance of actions based on whether the group of the tags 104A-C represented by the tag 102 is presently intact, or whether one or more of the tags 104A-C is deemed not to be within the group.

The system 100 includes a processing device 108 that can be implemented using one or more examples described with reference to FIG. 15. In some implementations, the processing device 108 may be implemented by one or more processors executing instructions stored in one or more instances of computer-readable storage medium. For example, a processor can execute instructions stored in a memory to instantiate and operate the processing device 108. Communication between the tag 102 and the processing device 108 can occur by way of at least one wireless signal 110. In some implementations, one or more of the tags 104A-C can communicate directly with the processing device 108.

The processing device 108 can be implemented as a single physical component, or can be distributed over multiple physical components. In some implementations, the processing device 108 may include a mobile electronic device (e.g., a smartphone, tablet, watch, wearable device, and/or laptop). In some implementations, the processing device 108 may include a dedicated stand-alone device (e.g., a hub in the system 100).

The processing device 108 can communicate directly and/or via a network with one or more other components within the system 100, outside the system 100, or both. In some implementations, the processing device 108 may participate in group management (e.g., of the tag 102 and/or the tags 104A-C), notification management (e.g., to a user by way of the tag 102 and/or tags 104A-C, or another user interface, such as the display device 1538 in FIG. 15), software updates (e.g., of the tag 102 and/or the tags 104A-C), power management (e.g., of the tag 102 and/or the tags 104A-C), and/or artificial intelligence (e.g., to control the tag 102 and/or the tags 104A-C, and/or to control responses to scenarios involving it or them).

The system 100 can include or make use of one or more remote processing devices, here referred to as clouds 112. The cloud 112 can be implemented using one or more examples described with reference to FIG. 15. Communication between the processing device 108 and the cloud 112 may occur by way of at least one signal 114. The signal 114 can be a wireless signal and/or a wired signal and here schematically illustrates a data network connection between devices. The signal 114 can be sent through one or more networks, including, but not limited to, a local network and/or the internet. In some implementations, the processing device 108 or components thereof can be implemented at least in part by the cloud 112. In some implementations, the tag 102 and/or at least one of the tags 104A-C can communicate directly with the cloud 112.

Activity can be monitored and managed in the system 100. Activity can include, but is not limited to, one or more aspects of presence, proximity, movement, or concentration, and/or the duration of any such presence, proximity, movement, or concentration. Activity monitoring and management in the system 100 can occur by way of the processing device 108 and/or the cloud 112. Here, an activity management module 116 is shown as part of the processing device 108 for purpose of illustration only. The activity management module 116 can accumulate data 118 to facilitate and/or in performing such activity management. For example, the data 118 is stored in a computer-readable medium. For example, data can be stored as state variables on a processing device.

The system 100 can be configured according to one or more levels. In some implementations, the processing device 108 and at least the tag 102 can be considered an item level in the system 100. For example, the item level can facilitate system awareness of at least the presence, proximity and movement of the physical item(s) associated with the tag(s) 102. In some implementations, a group level in the system 100 can include the item level just mentioned and one or more of the tags 104A-C. For example, the group level can facilitate that the tag 102 serves as the parent of the tag(s) 104A-C and monitors the at least the presence, proximity and movement of the physical item(s) associated with the tag(s) 104A-C. In some implementations, a home level in the system 100 can include the group level just mentioned and one or more connected components, including, but not limited to a hub in the system 100, a router, a digital assistant, and/or a smart lightbulb. For example, the home level can provide and manage awareness about the presence, proximity and movement of the physical item(s) associated with the tag(s) 102 and/or the tag(s) 104A-C in a broader spatial environment, such as in a home, office or other location. In some implementations, a system intelligence level in the system 100 can include the home level just mentioned and one or more cloud services. For example, the cloud service(s) can provide contextual notification based on the presence, proximity or movement recognized within the home level. As another example, the cloud service(s) can provide predictive ability based on data recognized in the system 100 and/or tracked behavior relating to the system 100 and/or the physical objects associated with the tags 102 and/or 104A-C.

Contextualization in the system 100 can occur by way of the processing device 108 and/or the cloud 112. Here, a contextual engine 120 is shown as part of the processing device 108 for purpose of illustration only. The contextual engine 120 can harvest data from one or more sources (e.g., based on detecting the behavior of a nearby device) and use it for contextualization, prediction, and/or to adapt its behavior. Harvested data can include external data, such as calendar information for event data, weather data for weather conditions, or crowd-based data, to name just a few examples. Data can be harvested in one or more ways. In some implementations, each device maintains a state table with various state information about the system. For example, as each device determines a change in the information, the device may update the data in the local state variable and then send the new data to the other devices in the system so that each device maintains a current view of the system.

In some implementations, contextualization can include collection of standardized data from one or more entities in the system 100 (e.g., ultimately from the tag 102 and/or the tags 104A-C), collection of disparate device data (e.g., data that is unexpected or otherwise does not conform to a data standard), and/or performance of system dictated actions (e.g., issuing a notification, modifying a behavior, redistributing one or more system resources). Contextualization can be related to or facilitated by the invocation of one or more rules 122 in the system 100. Solely as illustrative examples, the rule(s) 122 can define, with regard to the tag 102 and/or the tag(s) 104A-C, one or more locations where presence is permitted, required, or is not permitted; one or more objects or persons with which a certain proximity is permitted, required, or is not permitted, one or more characteristics of movement that is permitted, required, or is not permitted; and/or one or more concentrations that is permitted, required, or is not permitted. The rule(s) 122 can specify actions performable by the system 100 under specific circumstances (e.g., to generate a notification or to energize or de-energize a component). For example, the rules 122 are stored in a computer-readable medium.

Contextualization can be based on one or more aspects of environmental understanding. In some implementations, an environmental understanding can include information or input that can be processed (e.g., weather conditions, time-based information, information extracted from a calendar, location, presence and/or activity). For example, notification that one of the tags 104A-C is not currently present in the group represented by the tag 102 can be conditioned on some aspect of the weather information (e.g., whether precipitation is forecast).

Some examples herein describe that a tag (e.g., a parent tag or child tag) independently is in charge of deciding when to beacon, such as randomly or at regular intervals, as a way to allow a system to detect and organize that tag. In other implementations, a tag beacons in response to detecting that another device (e.g., a tag, processing device, and/or IoT device) is nearby according to a proximity metric. This can allow the tag to improve its power management, in that transmissions are not made unless they are likely to be detected. The tag can be configured to allow one or more specific devices (e.g., a specific tag, processing device, or IoT device), or types of device (e.g., any tag, processing device, or IoT device), to wake up the tag. When the processor of the tag is suspended (e.g., in a sleep mode or other low-power mode), the wireless interface of the tag (e.g., a radio) can remain powered so as to detect a wireless wake-up signal. The tag can have a programming that causes it to beacon (e.g., randomly or regularly) when it is awake.

Figure 2:
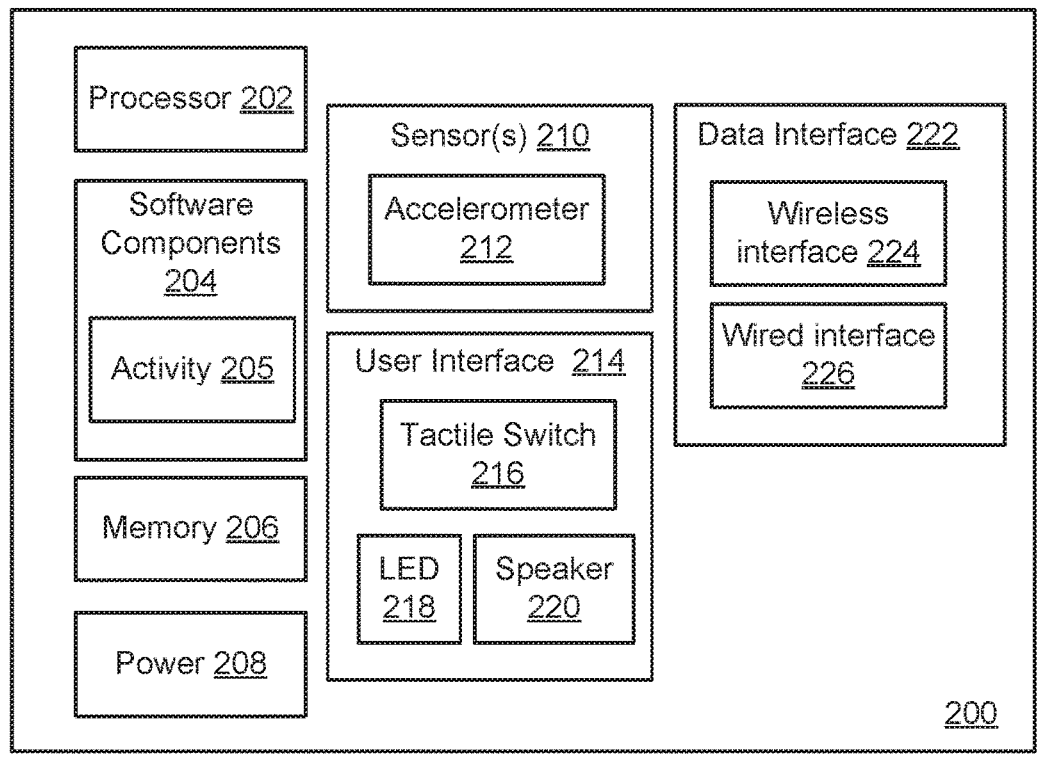
FIG. 2 shows a block diagram of an example of a tag.

FIG. 2 shows a block diagram of an example of a tag 200. The tag 200 can be implemented using one or more examples described with reference to FIG. 15. The tag 200 can be implemented substantially inside a housing that facilitates attachment of the tag 200 to, or otherwise coupling the tag 200 with, a physical object. For example, the housing can include one or more enclosures serving to contain at least some of the components of the tag 200 as a cohesive unit. The tag 102 and/or the tags 104A-C can be implemented using the tag 200. Solely as an example, and without limitation, such housing can have a thickness that is on the order of a few mm, and or a greatest width in any dimension that is on the order of tens of mm. For example, the housing can be an essentially circular disc. An identifier (e.g., a QR code) can be affixed to the housing to aid in identification and/or a setup process.

The tag 200 can be attached to, embedded within, or otherwise coupled to the physical object in one or more ways. For example, the tag 200 can be provided with an adhesive on the housing that couples to a surface on the physical object. As another example, the tag 200 can be provided with a holder that attaches to the tag 200, the holder having a loop (e.g., a keyring) for being coupled to the physical object.

The tag 200 can include at least one processor 202. The processor 202 can be semiconductor-based and can include at least one circuit that performs operations at least in part based on executing instructions. The processor 202 can be a general purpose processor or a special purpose processor.

The tag 200 can include one or more software components 204. The software components 204 can include software (e.g., firmware). In some implementations, the software components 204 includes an activity component 205 that can control one or more aspects of operation by the tag 200. For example, the activity component 205 can include some or all functionality described with reference to the activity management module 116 (FIG. 1) or the contextual engine 120. The software components 204 can be formulated using one or more programming languages that facilitate generation of instructions comprehensible to the processor 202.

The tag 200 can include at least one memory 206. The memory 206 can store information within the tag 200. The memory 206 can be implemented in the form of one or more discrete units. The memory 206 can include volatile memory, non-volatile memory, or combinations thereof.

The tag 200 can include a power supply 208. The power supply 208 can power some or all of the components of the tag 200 or other components not shown. In some implementations, the power supply 208 includes one or more electrochemical cells (e.g., a lithium-ion cell) capable of storing energy in chemical form and allowing consumption of that energy by way of conversion into electrical current. In some implementations, the power supply 208 includes a capacitor capable of storing energy in an electric field. The power supply 208 can be rechargeable (e.g., by external power from a voltage/current source, or from a solar cell) or non-rechargeable. For example, the power supply 208 can be recharged by electrically connecting a power source to physical pins that contact the power supply 208. As another example, the power supply 208 can be recharged wirelessly (e.g., by inductive charging). Kinetic energy harvesting and/or thermal energy harvesting may be used. In some implementations, a near-field communication (NFC) coil can also be used as a charging coil for inductive charging. For example, the power supply 208 can be recharged wirelessly in near proximity (e.g., by inductive coupled charging using internal dedicated coil or reusing an NFC coil for charging). As another example, the power supply 208 can be recharged wirelessly in far field (e.g., by electric field charging) or using energy harvesting techniques from multiple ambient sources, including kinetic or bio-mechanical sources (e.g., a piezo electric generator sensing vibration or thermo-electric generator (TEG) which harvests energy from temperature gradient). In some implementations, ambient backscatter energy may be used to power the tag directly (e.g., in lieu of using an electrochemical cell to store energy).

The tag 200 can include one or more sensors 210. The sensor(s) 210 can be configured to detect one or more characteristics of the environment or other surrounding to which the tag 200 is subjected. The sensor(s) 210 can detect one or more aspects including, but not limited to, moisture, humidity, temperature, pressure, altitude, acoustics, wind speed, strain, shear, magnetic field strength and/or orientation, electric field strength and/or orientation, electromagnetic radiation, particle radiation, compass point direction, or acceleration. Here, for example, the sensor 210 includes an accelerometer 212. For example, the accelerometer 212 may be used to detect if the tag 200 is in motion, and the processor 202 of the tag 200 may decide to change the behavior of the tag 200 based on the motion detected. For example, the beaconing pattern of the wireless interface 224 may be increased when the tag 200 is determined to be moving. Collection of data (e.g., one or more signals) from the sensor(s) 210 can be considered harvesting of information that can be the basis for deterministic behavior, predictive behavior, and/or adaptive behavior in the system in which the tag 200 is implemented.

The tag 200 may include one or more user interfaces 214. The user interface(s) 214 can facilitate one or more ways that a user can make input to the tag 200 and/or one or more ways that the tag 200 can make output to a user. In some implementations, the user interface 214 includes a tactile switch 216. For example, activating the tactile switch can open and close an electric circuit on the tag 200, thus providing input to the tag 200. In some implementations, the user interface 214 includes at least one light-emitting diode (LED) 218. The LED 218 can illuminate using one or more colors to signal a status of the tag 200 or of another tag, and/or to convey an instruction to the user. A red-blue-green LED can be used for the LED 218. In some implementations, the LED 218 can indicate power and/or pairing status during setup of the tag 200. In some implementations, the LED 218 can confirm the presence or absence of one or more child tags. In some implementations, the user interface 214 includes at least one speaker 220. The speaker 220 can emit one or more portions of audio to signal a status of the tag 200 or of another tag, and/or to convey an instruction to the user. For example, the speaker 220 can include an audio piezo buzzer.

The tag 200 may include at least one data interface 222. Here, the data interface 222 is shown as including a wireless interface 224 and a wired interface 226. The data interface 222 can facilitate communication between the tag 200 and at least one component in a system, such as during operation or a software update. For example, the data interface 222 can facilitate the wireless signal 110 (FIG. 1) between the tag 102 and the processing device 108. As another example, the data interface 222 can facilitate one or more of the wireless signals 106A-C between the tag 102 and the tags 104A-C. In some implementations, the data interface 222 can be configured for short-distance communications (e.g., in a personal-area or near-me network). In some implementations, the data interface 222 can be also or instead be configured for longer-distance communications (e.g., in a local-area or wide-area network). For example, and without limitation, the data interface 222 can operate in accordance with the principles of one or more of Bluetooth communication, Bluetooth Low Energy (BLE) communication, Zigbee communication, Wi-Fi communication, Long-Term Evolution (LTE) communication, NFC, Long Range (LoRa) communication, ultra wide band (UWB) communication, radio-frequency identification (RFID) communication, Ethernet, Ethernet over powerline, or Narrow-Band (NB).

The data interface 222 (e.g., the wired interface 226) can make use of physical pins on the tag 200. In some implementations, the physical pins at least partially extend beyond the hull of a housing that contains the tag 200 so that the physical pins can be contacted by another component. In some implementations, the physical pins relating to the data interface 222 can be grouped with physical pins relating to the power supply 208 (e.g., to be used in recharging). For example, the physical pins relating to the data interface 222 can be used to trigger the tag 200 to be ready to receive electrical input on the physical pins relating to the power supply 208.

The tag 200 can include at least one bus or other communication component that facilitates communication between two or more of the processor 202, software components 204, memory 206, sensor(s) 210, user interface 214, and/or data interface 222.

The tag 200 can be implemented as an intelligent device that can be used for personal tracking and organization. The tag 200 can be configured to communicate directly (or indirectly, such as via a network) with one or more instances of the tag 200, such as with a child tag when the tag 200 is considered a parent tag, or with a parent tag when the tag 200 is considered a child tag. The tag 200 can be configured for direct/indirect communication with a processing device (e.g., the processing device 108 in FIG. 1, a third-party IoT device, and/or a cloud server (e.g., the cloud 112 in FIG. 1). The tag 200 can be configured to generate and record state information. For example, the tag 200 can record events that relate to the tag 200 and/or to another tag. The tag 200 can represent a single object (e.g., the physical object to which the tag 200 is attached) or a group of objects (e.g., the physical objects to which respective child tags are attached when the tag 200 is considered a parent tag). The tag 200 can be configured to have one or more relationships with another instance of the tag 200, with a person (e.g., an owner or user), and/or with a location. For example, such relationships can be defined in the rules 122 (FIG. 1).

The tag 200 can be used to organize essentials (e.g., physical objects of significance) and for personal organization. The tag 200 can help a user quickly locate the physical object to which the tag 200 is attached. The tag 200 can serve as a parent tag for one or more child tags (e.g., instances of the tag 200) within a group solution, which can allow for tracking of the presence, proximity, and movement of other physical objects. The tag 200 can serve as a location marker. For example, this can be exploited by a location service designed to provide indications to the location of wireless-enabled devices.

Examples herein mention that a tag can serve as a child tag to another tag, which can be considered the parent tag. In some implementations, the child tag is implemented with all components of the tag 200, optionally with more components. In some implementations, the child tag can have fewer than all of the components of the tag 200. For example, the power supply 208 in the child tag may be non-rechargeable. As another example, the child tag may not have one or more of the sensor(s) 210 (e.g., the accelerometer 212 can be omitted). As another example, the LED 218 in the child tag can be a single-color LED (e.g., white). As another example, the child tag may not have the speaker 220. As another example, the child tag may not have the wired interface 226. For example, no physical data pins may be present on the housing of the child tag.

In operation, the child tag (e.g., including some or all of the components of the tag 200) can be used to organize a range of physical objects, including all everyday essentials that a person may have. The parent tag (e.g., including some or all of the components of the tag 200) can monitor the child tag(s) to which it is connected. As such, the parent tag can indicate the presence of a physical object to which the child tag is attached/coupled based on the child tag's proximity to the parent tag. For example, the parent tag can send a message indicating whether the child tag is within the range of the parent tag or not within the range of the parent tag.

Examples herein illustrate that a tag (e.g., the tag 200) can have an awareness of circumstances. Aspects of the awareness can be categorized as being either internal or external. An internal awareness may pertain to the physical object itself. In some implementations, the internal awareness can be further separated into preset state values and dynamic state values. Preset state values can include, but are not limited to, make, model, manufacturing date, unique identifier (UID), device info, object type, or manufacturer's suggested retail price (MSRP). Dynamic state values can include, but are not limited to, battery level, power consumption, market value, directive, beaconing rate, communications frequency, communications protocol, object relationship logic, owner identity, permissions, internal clock, motion, or orientation.

An external awareness can relate to factors externally related to the physical object. External factors can include, but are not limited to, relative location, geo location, time, sensor data, objects nearby, proximity, relative motion of objects nearby, or duration of any states.

Figure 3:
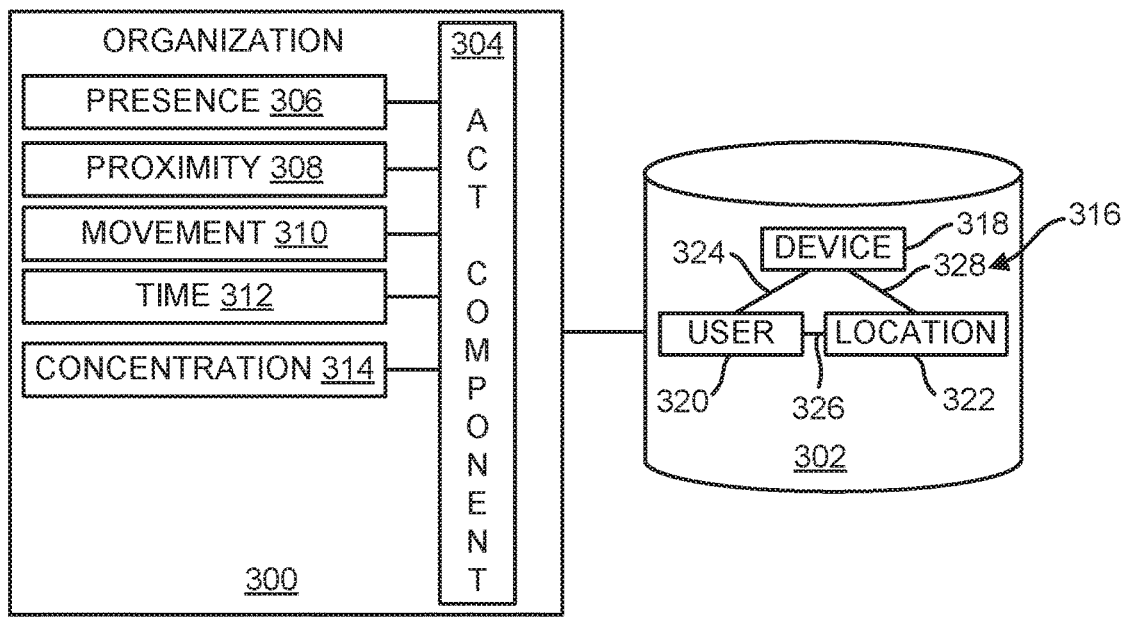
FIG. 3 shows an example of an activity component and a rules repository.

FIG. 3 shows an example of an organization module 300 and a rules repository 302. The organization module 300 and the rules repository 302 can be used with one or more other examples described elsewhere herein. The organization module 300 and the rules repository 302 can be implemented using one or more examples described with reference to FIG. 15. For example, the organization module 300 can be implemented by way of at least one processor executing instructions stored in a computer-readable medium. The rules in the rules repository 302 can relate to relationships including, but not limited to, permissions, groupings, and/or parent-child hierarchies.

The organization module 300 can be implemented in a device such as the tag 200 (FIG. 2), the tags 102 and/or 104A-C (FIG. 1), or in the processing device 108 (FIG. 1), to name just a few examples. Such device(s) can receive wireless signals from one or more items being monitored. For example, the tag 102 when serving as a parent tag can receive the wireless signals 106A-C from the tags 104A-C, respectively, serving as child tags. As another example, the processing device 108 can receive the wireless signal 110 from the tag 102.

The organization module 300 can use the received signal(s) to gain insight into at least the presence, proximity, or movement of the transmitting device, or of a device related to the transmitting device. In some implementations, received signal strength indication (RSSI) can be used as part of such a determination. The RSSI can indicate the power present in the received signal (e.g., the wireless signals 106A-C or the wireless signal 110). In some implementations, relative RSSI can be used. Generally speaking, when the transmitting device is closer to the receiving device, the RSSI tends to be greater because there is more power in the received signal. In some implementations, a first tag can determine, in its wireless module, an RSSI for a signal that the first tag receives from a second tag. The first tag can receive from the second tag a "received RSSI" value reflecting an RSSI determined by the second tag. The first and second tags can store the determined RSSI and the received RSSI value in state variables.

The organization module 300 can detect "activity" of a tag, processing device, and/or a third-party IoT device, in any of several senses, including, but not limited to, that the device is present in a system, that the device is proximate to something (e.g., another device, a tag, an object, or a user), and/or that the device is moving, and the organization module 300 can take action if appropriate. The organization module 300 can also or instead detect the "inactivity" of a device and take action if appropriate. As such, the organization module 300 may not merely detect, or respond to, a device's action.

In some implementations, activity can be detected or determined in one or more ways. For example, a tag can send a message when the tag senses (e.g., by an accelerometer) that it is moving. As another example, a first tag can detect that a second tag is moving because the RSSI is decreasing in a predictable manner. As another example, a first tag can detect that a second tag is moving because the RSSI is decreasing and a third tag reports increasing RSSI with the second tag.

In some implementations, time (e.g., duration) can be part of such a determination of activity. In some implementations, a transmitting device may include a timestamp or other time identifier in the transmitted message, and the receiving device can compare the timestamp/identifier with its (internal) clock to determine an amount of time that passed between the sending and the receipt of the wireless signal. For example, the clocks in the transmitting and receiving devices can be synchronized to a master clock, or the receiving device may know how to translate the transmitting device's timestamp into its local time. Internal processing delays (at the transmitting or receiving end) can be accounted for. As another example, the time can be measured from the moment of sending a request for a response until the response is received. The time is a measure of the latency experienced in communication between two devices (e.g., two tags, a parent tag and a child tag, and/or a tag and a processing device). A latency value can be defined based on the time it takes for a signal to reach the receiver. The latency value, moreover, can be used to characterize the distance between the transmitting and receiving devices, which gives an indication as to the relative position of the devices. In some implementations, time may be measured with round trip time (RTT) for estimating distance. For example: the sender sends a message, and based on the time it takes to receive a response, the sender can infer things about link quality and distance. RTT can be used to give information about packet loss, error rate, or number of hops (in the case of a mesh search).

In some implementations, connectivity can be part of such a determination. In some implementations, connectivity can represent whether a device (e.g., a parent tag) is able to communicate with another device (e.g., a child tag). For example, a connectivity parameter can be a binary factor dependent on whether communication is currently established between two devices.

The organization module 300 can use one or more of, or a combination of, at least RSSI and connectivity to measure at least presence, proximity and movement of any tag. In some implementations, the RSSI can be represented by a value RSSI and the connectivity parameter can be denoted by C. The organization module 300 can then operate based on a metric $$A(RSSI, C),$$

where A indicates an activity of at least one tag and reflects a measure of the distance, proximity, or movement between, say, a child tag and a parent tag. A can be expressed as depending on the RSSI, latency value, and connectivity as follows:

$$A = a_f f(RSSI) + a_g g(C),$$

where f is a function depending on at least the RSSI, g is function depending on at least the connectivity value C, and $a_f$ and $a_g$ are coefficients or other modifying factors (e.g., dynamically scalable factors) for the functions f and g, respectively.

The activity A can also or instead take into account one or more other characteristics. For example, latency can be taken into account (e.g., denoted by L). For example, packet error rate can be taken into account (e.g., denoted by PER). For example, packet loss can be taken into account (e.g., denoted by PL). For example, change in RSSI over time can be taken into account (e.g., denoted by ΔRSSI). For example, change in connectivity over time can be taken into account (e.g., denoted by ΔC). For example, change in latency over time can be taken into account (e.g., denoted by ΔL). For example, change in packet error rate over time can be taken into account (e.g., denoted by ΔPER). For example, change in packet loss over time can be taken into account (e.g., denoted by ΔPL). In some implementations, the activity A can be based on one or more of RSSI, C, L, PER, PL, ΔRSSI, ΔC, ΔL, ΔPER, or ΔPL.

As such, a proximity metric for the distance between devices (e.g., two tags, a parent tag and a child tag, and/or a tag and a processing device) can be defined based on at least one of the RSSI, the latency value, the connectivity parameter, and/or changes in one or more of such characteristics, for example as shown for A above. This can be considered a proximity measure that the organization module 300 can use in determining the presence, proximity, and movement of one or more tags. The proximity measure takes into account at least one of RSSI, C, L, PER, PL, ΔRSSI, ΔC, ΔL, ΔPER, or ΔPL, and can optionally take into account also one or more other parameters. The organization module 300 can include an activity component 304 that can be responsible for determining and providing a proximity measure (e.g., based on A above). In some implementations, the activity component 205 (FIG. 2) can include one or more aspects of functionality described with reference to the activity component 304.

The organization module 300 can include one or more components that facilitate use of a proximity measure in determining, and reacting to, the activity of one or more tags. In some implementations, the organization module 300 includes a presence component 306 coupled to the activity component 304. For example, the presence component 306 can make use of the activity measure of the activity component 304 to determine the presence of a tag (e.g., whether the tag 104A (FIG. 1) serving as a child tag is present relative to the tag 102 serving as a parent tag for the tag 104A). As another example, a tag can be deemed present if it is detected by the system, whether the tag is proximate to another tag (e.g., its parent tag) or not. The determination of whether a tag is present can depend on the rules in the rules repository 302, and as such can be different for different physical objects. For example, a wallet labeled with a tag can be deemed present if it is detected as being inside the dwelling of the person who owns the wallet; a wheelbarrow, on the other hand, can be deemed to be present if it is detected by either the system monitoring the owner's house or the corresponding system at the neighbor's house, in that the neighbor may be permitted to borrow the wheelbarrow from the owner's yard.

In some implementations, the organization module 300 includes a proximity component 308 coupled to the activity component 304. For example, the proximity component 308 can make use of the activity measure of the activity component 304 to determine the proximity of a tag (e.g., how proximate the tag 104A (FIG. 1) serving as a child tag is relative to the tag 102 serving as a parent tag for the tag 104A).

In some implementations, the organization module 300 includes a movement component 310 coupled to the activity component 304. For example, the movement component 310 can make use of the activity measure of the activity component 304 to determine the movement of a tag (e.g., how the tag 104A (FIG. 1) serving as a child tag moves relative to the tag 102 serving as a parent tag for the tag 104A).

In some implementations, the organization module 300 includes a time component 312 coupled to the activity component 304. For example, the time component 312 can make use of the activity measure of the activity component 304 to determine a duration relating to a tag (e.g., how long the tag 104A (FIG. 1) serving as a child tag is present, proximate, and/or moving relative to the tag 102 serving as a parent tag for the tag 104A). As another example, a time as in the time of day at a particular location, can be a factor in applying a rule based on contextualized information.

In some implementations, the organization module 300 includes a concentration component 314 coupled to the activity component 304. For example, the concentration component 314 can make use of the activity of the activity component 304 to determine a concentration of at least one tag (e.g., some or all of the tags 104A-C (FIG. 1) serving as child tags relative to the tag 102 serving as a parent tag for the tags 104A-C). For example, a concentration can be used to provide multi-factor authentication of a user. As another example, a concentration can be used to generate a heat map of a location (e.g., to aid a determination of what type of environment it is).

The activity component 304 can factor in a temporal component in the determination of an activity measure. In some implementations, one of the rules in the rules repository 302 can define that an alert should be generated if one of the tags 104A-C (FIG. 1) is not present in the group represented by the tag 102. However, if for example, the tag 104A had been detected as present within the group over an extended period of time and was not detected as undergoing (significant) movement at the time its signal was lost, the activity component 304 can apply a grace period (e.g., on the order of a few or multiple seconds) before generating the alert. For example, this temporal component (e.g., a grace period) can account for the situation where the signal 106A (FIG. 1) from the tag 104A was temporarily blocked and the absence of the signal 106A did not correspond to the tag 104A being missing from the group represented by the tag 102. Also, or instead, another component in the organization module 300 can apply the temporal component to a corresponding determination.

The organization module 300 can take into account contextualized information in determining the activity (e.g., presence, proximity, and/or movement) of any tag, in performing one or more actions in response thereto, or in deciding not to take action. In some implementations, the contextual engine 120 (FIG. 1) or a similar component can serve to contextualize harvested information so that the rules in the rules repository 302 can be applied appropriately.

The tags (e.g., the tag 102 and/or the tags 104A-C in FIG. 1) can be proxies for other devices, users, and/or locations. The rules in the rules repository 302 can reflect such an organization. In some implementations, a rule 316 can reflect one or more of a device 318, a user 320, or a location 322. Moreover, the rule 316 can involve a device-user relationship 324, a user-location relationship 326, and/or a device-location relationship 328. As such, any of a number of relationships can be taken into account when applying the rule(s) in the rules repository 302, and can be reflected in the particular action (or a non-action) taken in response.

As such, the contextual engine 120 in FIG. 1 is an example of a contextual engine implemented using a processor (e.g., the processing device 1502 in FIG. 15) executing instructions stored in a memory (e.g., the memory 1504 in FIG. 15), the contextual engine configured to identify an action relating to at least one tag of a plurality of tags (e.g., two or more of the tags 102 and/or 104A-C) based on an activity measure (e.g., determined by the activity component 304) for the corresponding tag.

The rules 122 in FIG. 1 can be stored in a rules repository accessible to a contextual engine (e.g., to the at least one processor of the contextual engine 120 in FIG. 1), the rules repository having stored therein rules (e.g., the rule 316) regarding respective actions performable by the activity component (e.g., by the at least one processor of the organization module 300), the rules depending on the activity measure (e.g., determined by the activity component 304) for the at least one of the first plurality of tags, the action identified using the rules.

A user interface can be provided on one or more devices. In some implementations, a graphical user interface can be provided on a processing device (e.g., the processing device 108 in FIG. 1), and/or a tag can provide for input and/or output (e.g., by way of the user interface 214 in FIG. 2). The user interface can be based on, and reflect, one or more status of a tag (e.g., the tags 102 and/or 104A-C in FIG. 1). In some implementations, a tag can have a status of connected, out of range, or marked as lost. For example, in the connected state, the user interface can provide a control for the user to initiate a locate function for the item.

In the out of range state, the user interface can provide a control for identifying the location where the system most recently detected the tag. As another example, the user interface can provide a control for marking the tag as lost.

In the marked as lost state, the user interface can provide a control for identifying the location where the system most recently detected the tag. As another example, the user interface can provide a control for launching a crowd-location function for the tag. As another example, the user interface can provide a control for marking the tag as found.

The user interface can provide one or more other functionalities relating to a tag (e.g., a parent tag or a child tag). Such functionality can include, but is not limited to, adding a tag; defining or editing a group of tags; defining or editing a rule relating to one or more tags; viewing and/or editing details of a tag or a group of tags; re-calibrating a tag with regard to a processing device or to at least one other tag; replacing a tag; deleting a tag; alerting that a tag battery needs recharging; alerting that a non-rechargeable battery is running out of power; performing an update (e.g., of software or firmware); prioritizing among tags; and combinations thereof.

FIG. 4 schematically shows a layout 400 of a building in which a system can organize physical items. The examples regarding the layout 400 can be used with one or more other examples described elsewhere herein. The examples regarding the layout 400 can be implemented using one or more examples described with reference to FIG. 15. In the layout 400, one or more devices (e.g., a tag, IoT device, and/or a processing device) can serve as a point of reference with regard to a tag and thereby facilitate the system providing an indication to the location of that tag.

The layout 400 shows a top view of a floorplan that includes, for example, a kitchen/living room area 402, a balcony 404, bedrooms 406, 408, and 410, and an office 412. Tags and other items within the layout 400 may here be shown with an enlarged size for clarity. A system for organizing and responding to activity can be managed by a processing device 414 (e.g., a user's smartphone, a laptop or desktop computer, or a dedicated standalone device) that is here located in the office 412. The processing device 414 can operate in conjunction with one or more computer devices, including, but not limited to with devices in the cloud 112 (FIG. 1).

The layout 400 can include IoT devices. Here, a smart lightbulb 416 is located in the kitchen/living room area 402, a smart lightbulb 418 is located in the bedroom 408, and a smart lightbulb 420 is located in the bedroom 410. As used herein, a smart lightbulb is an IoT device that includes a light source (e.g., an LED light or a fluorescent light) and (e.g., wireless) communication circuitry that allows the smart lightbulb to communicate with at least one other device. For example, the other device can be used to remotely switch the light source on or off, or dim the generated light. The smart lightbulb may communicate using one or more wireless or wired protocols, including, but not limited to, Bluetooth communication, BLE communication, Zigbee communication, Wi-Fi communication, LTE communication, NFC, Long Range (LoRa) communication, ultra wide band (UWB) communication, radio-frequency identification (RFID) communication, Ethernet, Ethernet over powerline, or NB. Each of the smart lightbulbs 416, 418, and 420 can be mounted to an installed light socket (e.g., in a ceiling, wall, or floor of the layout 400), or to a portable light fixture (e.g., plugged into a wall outlet), to name just a few examples.

A tag 422 (e.g., the tag 102 and/or one of the tags 104A-C in FIG. 1) has been applied to a physical object 424 in the bedroom 408. The physical object 424 can have any shape or size, and is here schematically illustrated as a triangular object. In this example, both the tag 422 and the smart lightbulb 418 in the bedroom 408 include wireless communication circuitry. Here, a wireless signal 426 is sent between the tag 422 and the smart lightbulb 418. For example, the wireless signal 426 can include data such as an identifier (e.g., a MAC address) for the smart lightbulb 418 and the data can be passed on by the tag 422 (e.g., to the processing device 414) for use in providing an indication to the location of the tag 422. In some implementations, the tag 422 may pass the data to a processing device (e.g., the processing device 414) through one or more pathways, including, but not limited to, by a wireless transfer. For example, the tag 102 (FIG. 1) may pass the data by way of the wireless signal 110. As another example, the wireless signal 426 can include data such as an identifier (e.g., a MAC address) for the tag 422 and the data can be passed on by the smart lightbulb 418 (e.g., to the processing device 414) for use in providing an indication to the location of the tag 422. In some implementations, the smart lightbulb 418 may pass the data to a processing device (e.g., the processing device 414) through one or more pathways, including, but not limited to, by a wireless transfer. For example, the smart lightbulb 506 (FIG. 5) described below may pass the data by way of the wireless connection 512. Examples of providing an indication are described below.

A tag 428 (e.g., the tag 102 and/or one of the tags 104A-C in FIG. 1) has been applied to a physical object 430 in the bedroom 410. The physical object 430 can have any shape or size, and is here schematically illustrated as a rectangular object. A tag 432 (e.g., the tag 102 and/or one of the tags 104A-C in FIG. 1) has been applied to a moving physical object 434 that is currently in the bedroom 410. For example, the moving physical object 434 may be a robotic vacuum cleaner that ambulates within the layout 400 as indicated by an arrow 436. In this example, the tags 428 and 432, and the smart lightbulb 420 in the bedroom 410, include wireless communication circuitry. Here, a wireless signal 438 is sent between the tag 428 and the smart lightbulb 420. For example, the wireless signal 438 can include data such as an identifier (e.g., a MAC address) for the smart lightbulb 420 and the data can be passed on by the tag 428 (e.g., to the processing device 414) for use in providing an indication to the location of the tag 428. As another example, the wireless signal 438 can include an identifier (e.g., a MAC address) for the tag 428 and the data can be passed on by the smart lightbulb 420 (e.g., to the processing device 414) for use in providing an indication to the location of the tag 428. Also, a wireless signal 440 is sent between the tag 428 and the tag 432. For example, the wireless signal 440 can include data such as an identifier (e.g., a MAC address) for the tag 428 and the data can be passed on by the tag 432 (e.g., to the processing device 414) for use in providing an indication to the location of the tag 428. As another example, the wireless signal 440 can include data such as an identifier (e.g., a MAC address) for the tag 432 and the data can be passed on by the tag 428 (e.g., to the processing device 414) for use in providing an indication to the location of the tag 428. Examples of providing an indication are described below.

Tags 442 and 444 (e.g., the tag 102 and/or one of the tags 104A-C in FIG. 1) are currently located in the kitchen/living room area 402. In this example, the tags 442 and 444, and the smart lightbulb 416 in the kitchen/living room area 402, include wireless communication circuitry. Here, a wireless signal 446 is sent between the tags 442 and 444. For example, the wireless signal 446 can include data such as an identifier (e.g., a MAC address) for the tag 442 and the data can be passed on by the tag 444 (e.g., to the processing device 414) for use in providing an indication to the location of the tag 442. As another example, the wireless signal 446 can include data such as an identifier (e.g., a MAC address) for the tag 444 and the data can be passed on by the tag 442 (e.g., to the processing device 414) for use in providing an indication to the location of the tag 442. Also, a wireless signal 448 is sent between the tag 442 and the smart lightbulb 416. For example, the wireless signal 448 can include data such as an identifier (e.g., a MAC address) for the smart lightbulb 416 and the data can be passed on by the tag 442 (e.g., to the processing device 414) for use in providing an indication to the location of the tag 442. As another example, the wireless signal 448 can include data such as an identifier (e.g., a MAC address) for the tag 442 and the data can be passed on by the smart lightbulb 416 (e.g., to the processing device 414) for use in providing an indication to the location of the tag 442. Examples of providing an indication are described below.

A tag 450 (e.g., the tag 102 and/or one of the tags 104A-C in FIG. 1) has been applied to a physical object 452 in the bedroom 406. The physical object 452 can have any shape or size, and is here schematically illustrated as a rectangular object. The tag 450 and the processing device 414 in the office 412 include wireless communication circuitry. Here, a wireless signal 454 is sent between the tag 450 and the processing device 414. For example, the wireless signal 454 can include data such as an identifier (e.g., a MAC address) for the tag 450 and the data can be used by the processing device 414 for providing an indication to the location of the tag 450. As another example, the wireless signal 454 can include data such as an identifier (e.g., a MAC address) for the processing device 414 and the data can be passed on by the tag 450 (e.g., to another processing device) for use in providing an indication to the location of the tag 450. Examples of providing an indication are described below.

FIG. 5 shows an example of a system 500 that can provide one or more indications to a location of a physical object. The system 500 can be used with one or more other examples described elsewhere herein. The system 500 can be implemented using one or more examples described with reference to FIG. 15.

The system 500 here operates both inside and outside areas 502 and 504. The areas 502 and 504 can be any defined regions that are at least in part separated from other space, including, but not limited to, rooms within a building (e.g., a residential building, commercial building, or a public building). Here, a smart lightbulb 506 is currently located in the area 502, and a smart lightbulb 508 is located in the area 504.

The system 500 includes a processing device 510. In some implementations, the processing device 510 is configured to monitor and control at least the smart lightbulbs 506 and 508, and optionally one or more other smart appliances (not shown). In this example, a wireless connection 512 can be formed between the processing device 510 and the smart lightbulb 506, and a wireless connection 514 can be formed between the processing device 510 and the smart lightbulb 508.

The system 500 includes at least one tag 516 (e.g., the tag 102 and/or one or more of the tags 104A-C in FIG. 1). The tag 516 can be coupled to a physical object (not shown for simplicity) to facilitate organization of that physical object within the areas 502 and 504 and elsewhere. In this example, the tag 516 can establish a wireless connection with one or more other devices, for example by beaconing or by receiving a beacon from another device. Here, a wireless connection 518 is established between the tag 516 and the smart lightbulb 506.

The system 500 includes a processing device 520. In some implementations, the processing device 520 is configured to monitor and control at least the tag 516, and optionally one or more other tags (not shown). For example, the processing device 520 can operate as described with reference to the processing device 108 in FIG. 1. A connection 522 (e.g., a wireless connection) can be established between the processing device 520 and the processing device 510. In some implementations, the connection 522 can be a message exchange and can reflect the protocol and type of communications that are used between the processing device 510 and the smart lightbulbs 506 and 508. For example, a constrained application protocol (CoAP) can be used. In some implementations, the processing devices 510 and 520 can be implemented in the same device.

In some implementations, the connection 522 can allow the processing device 520 to query the processing device 510 using data (e.g., an identifier) about at least one of the smart lightbulbs 506 and 508 that the tag 516 detected, and the processing device 510 can respond with a plain-language term relating to that smart lightbulb. The processing device 520 can receive the data from the tag 516 when a wireless connection 524 exists between the processing device 520 and the tag 516. The wireless connection 524 does not exist when the tag 516 is out of range from the processing device 520, and is therefore shown as a dashed line. As another example, the connection 522 can allow the processing device 510 to provide the processing device 520 data (e.g., an identifier) about the tag 516 together with a friendly term relating to the smart lightbulb that detected the data from the tag 516. This can be done whether the wireless connection 524 currently exists or not.

Figure 6:
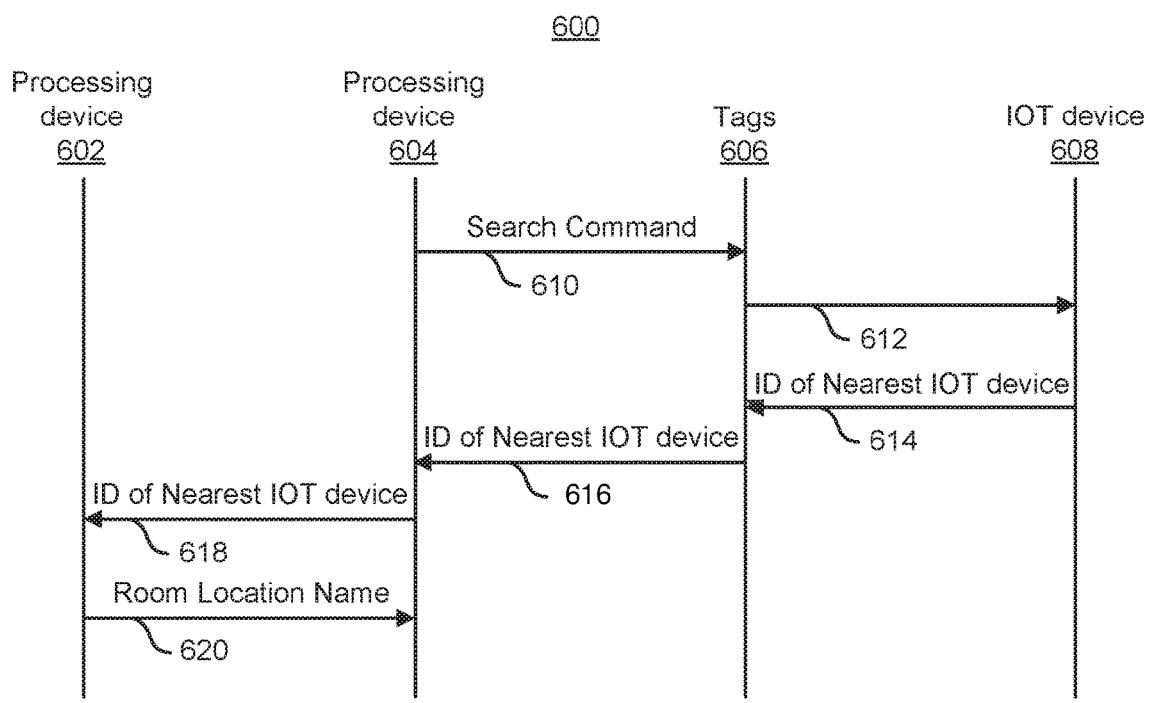
FIG. 6 shows an example diagram of a sequence for determining an indication to a location of a physical object.

FIG. 6 shows an example diagram of a sequence 600 for determining one or more indications to a location of a physical object. The sequence 600 can be used with one or more other examples described elsewhere herein. The sequence 600 can be implemented using one or more examples described with reference to FIG. 15.

The sequence 600 relates to multiple devices, including, but not limited to, a processing device 602 (e.g., the processing device 510 in FIG. 5), a processing device 604 (e.g., the processing device 520 in FIG. 5), at least one tag 606 (e.g., the tag 102 and/or 104A-C in FIG. 1, and/or the tag 516 in FIG. 5) having a wireless connection with the processing device 604, at least one IoT device 608 (e.g., one or more of the smart lightbulbs 506 and 508 in FIG. 5) having a wireless connection with the processing device 602. Each of the tags 606 can be coupled to a respective physical object to facilitate organizing of that physical object.

At 610, the processing device 604 can send a message with an instruction to the tag 606. In some implementations, the instruction may prompt the tag 606 to collect data from at least one of the IoT devices 608. For example, the processing device 604 can send a search command in a message to the tag 606 over a wireless signal.

At 612, the tag 606 can send a message using, for example, wireless communication to some or all of the IoT devices 608. The message may seek to trigger each receiving IoT device 608 to respond to the tag 606 with data regarding that IoT device 608. The data may include an identifier (e.g., a MAC address), to name just one example. In some implementations, the tag 606 may send a network join request message to the IoT device(s) 608 at 612. For example, if the IoT device(s) 608 rejects the request, the rejection(s) received by the tag 606 may contain data regarding the respective IoT device(s) 608. In some implementations, the tag 606 may send a device discovery request message to the IoT device(s) 608 at 612. In some implementations, the tag 606 may send a probe request message to the IoT device(s) 608 at 612. In short, at 612 the tag 606 may send (e.g., as a broadcast message) one or more messages seeking to obtain information regarding any responding device for use in providing an indication to the location of the tag 606.

At 614, one or more of the IoT devices 608 can send data to the tag 606. In some implementations, the data includes an identifier of the respective IoT device 608. For example, a MAC address can be provided.

When more than one of the IoT devices 608 provide their respective data to the tag 606, a selection of IoT devices 608 can be made such that the selection may be a subset of the IoT devices 608 that provided their respective data. In some implementations, the tag 606 can make the selection based on a proximity measure relating to the tag 606. The proximity measure can be applied to determine which N IoT devices of the IoT devices 608 (where N is 1, 2, 3, . . . ) is nearest to the tag 606.

In some implementations, the proximity measure can be based on one or more of RSSI, C, L, PER, PL, ΔRSSI, ΔC, ΔL, ΔPER, or ΔPL regarding the respective ones of the IoT devices 608. Some examples will be mentioned with reference again briefly to FIG. 4. For example, the tag 422 can select the data from the smart lightbulb 418 based on the wireless signal 426. As another example, the tag 428 can select the data of the smart lightbulb 420 which is relatively stationary, and not the data of the moving physical object 434 which is not stationary. In some implementations, the transmission power of the originating device can be taken into account when evaluating received signals. For example, the wireless signal 448 received by the tag 442 may be stronger than the wireless signal 446 received by the tag 442, but the smart lightbulb 416 may have a more powerful transmitter than the tag 444. Taking into account the differences in transmission capacity, the tag 442 may nevertheless determine that the tag 444 is closer to the tag 442 than what the smart lightbulb 416 is. As such, the tag 442 may select the data from the tag 444 which had a lesser signal strength. As another example, the tag 450 may essentially be reached only by the wireless signal 454 (from the processing device 414) and no communications from other devices in the layout 400. The absence of detection of any other wireless signals, together with the determinable attenuation of the wireless signal 454, may allow the tag 450 (or another processing device) to use the proximity measure to determine an at least partially secluded (e.g., within the bedroom 406) location near the processing device 414.

At 616, the tag 606 can provide at least some of the data to the processing device 604. In some implementations, the tag 606 has made a selection among data from multiple ones of the IoT devices 608. For example, the provided data relates to only the N IoT devices of the IoT devices 608 being nearest to the tag 606 according to a proximity measure. In some implementations, the tag 606 provides all data received from the IoT devices 608, together with other information (e.g., RSSI or another parameter) that allow the processing device 604 to make a selection among the data. For example, the processing device 604 selects the data from the N IoT devices of the IoT devices 608 being nearest to the tag 606 according to a proximity measure.

At 618, the processing device 604 can provide a request to the processing device 602. In some implementations, the request includes at least some of the data that the processing device 604 received from the tag 606. For example, the data can include the identifier(s) of the nearest IoT device(s) 608 to the tag 606.

At 620, the processing device 602 can provide a response to the request from the processing device 604. In some implementations, the response includes a descriptor that is associated with the data included in the request. The descriptor can include a friendly name of a room, location, or device (e.g., the IoT device 608). For example, when the data relates to the smart lightbulb 506 (FIG. 5), the descriptor can include a friendly name of the area 502 (e.g., "the bedroom") where the smart lightbulb 506 is located. The processing device 604 can present the descriptor to a user to provide an indication to the location of the tag 606, for example as described below.

The sequence 600 is an example of a method that can be performed to provide an indication to a location of a physical object. Such a method can include operations of: sending, by a first processing device (e.g., the processing device 604), a message with an instruction to a first tag (e.g., the tag 606) to collect first data from at least one device (e.g., the IoT device(s) 608), the first tag coupled to a first physical object (e.g., the physical object 424 in FIG. 4) for organizing the first physical object; receiving, by the first processing device, a message with the first data (e.g., an identifier of the IoT device(s) 608) from the first tag; obtaining, by the first processing device, a first descriptor (e.g., at 620) as being associated with the first data; and presenting, by the first processing device, the first descriptor to a user as an indication to a location of the first physical object.

As another example, such a method can include operations of: receiving, by a tag (e.g., the tag 606), a message with an instruction (e.g., at 610) from a processing device (e.g., the processing device 604) to collect first data from at least one device (e.g., the IoT device(s) 608), the tag coupled to a physical object (e.g., the physical object 424 in FIG. 4) for organizing the physical object; collecting (e.g., at 614), by the tag, the first data from the device; and providing (e.g., at 616), by the tag, a message with the first data to the processing device in response to the instruction.

Figure 7:
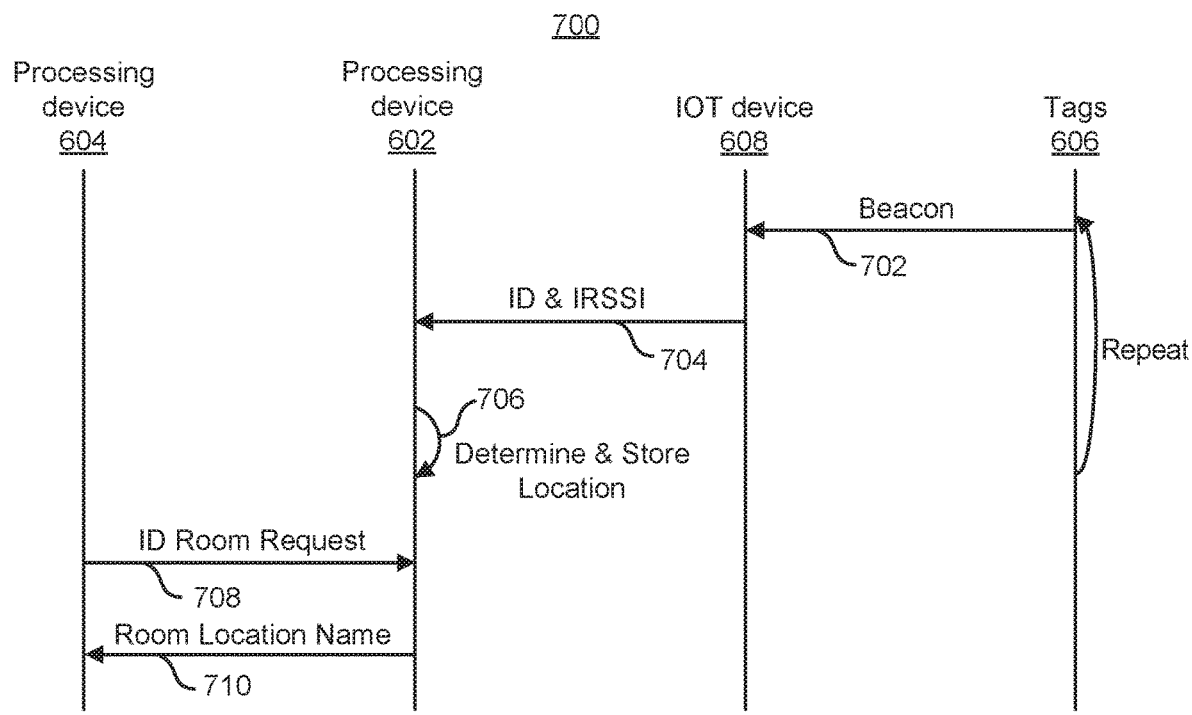
FIG. 7 shows another example diagram of a sequence for determining an indication to a location of a physical object.

FIG. 7 shows another example diagram of a sequence 700 for determining one or more indications to a location of a physical object. The sequence 700 can be used with one or more other examples described elsewhere herein. The sequence 700 can be implemented using one or more examples described with reference to FIG. 15.

The sequence 700 can be implemented by some or all of the devices described with reference to the sequence 600 (FIG. 6). Here, the sequence 700 involves the processing devices 604 and 602, the IoT device(s) 608, and the tag(s) 606. For example, the sequence 700 can operate also when one or more of the tags 606 is out of range of the processing device 604 (e.g., when the wireless connection 524 in FIG. 5 does not exist).

At 702, the tag 606 can send a wireless signal that is received by the IoT device 608. In some implementations, the wireless signal is a beacon that the tag 606 sends periodically or at random intervals. For example, the tag 516 in FIG. 5) can send a signal by the wireless connection 518 that is received by the smart lightbulb 506. In some implementations, the wireless signal includes data about the tag 606. For example, an identifier (e.g., a MAC address) of the tag 606 can be included.

At 704, the IoT device 608 can provide at least the data from the tag 606 to the processing device 602. In some implementations, the IoT device 608 can also provide one or more types of information relating to a proximity measure regarding how close the tag 606 is to the IoT device 608. For example, one or more of RSSI, C, L, PER, PL, ΔRSSI, ΔC, ΔL, ΔPER, or ΔPL can be forwarded.

At 706, the processing device 602 can perform processing involving at least the data from the tag 606 and the identity of the IoT device 608 from which the communication was received. For example, the processing device 602 can associate the data identifying the tag 606 with a friendly name corresponding to the IoT device 608, or to a location of that IoT device 608. When the processing device 602 receives data regarding multiple tags 606, corresponding records may be created for each of them.

When multiple ones of the IoT devices 608 are within range of the same tag 606, they may all report the same or corresponding data to the processing device 602. The processing device 602 may then identify at least one of those IoT devices 608 that is currently to be associated with that tag 606. In some implementations, this identification is based on a proximity measure relating to the tag 606 for each respective IoT device 608. For example, the processing device 602 can determine the nearest one(s) of the IoT devices 608 to the tag 606 and currently associate the data with the determined IoT device(s) 608.

At 708, the processing device 604 can send a request to the processing device 602. The request includes at least some data regarding at least one of the tags 606 for purposes of obtaining an indication to the location(s) of the tag(s) 606. In some implementations, the request can be sent by the connection 522 in FIG. 5. For example, the request can include an identifier of the tag(s) 606.

At 710, the processing device 602 can respond to the request from the processing device 604. In some implementations, the response includes a descriptor that is associated with the data included in the request. The descriptor can include a friendly name of a room, location, or device (e.g., the IoT device 608). For example, when the nearest IoT device 608 to the tag was the smart lightbulb 506 (FIG. 5), then the response can include a friendly name (e.g., "the bedroom") of the area 502.

The sequence 700 is an example of a method that can be performed to provide an indication to a location of a physical object. Such a method can include operations of: receiving, at a first processing device (e.g., at 704), a message with a first data sent by a first device (e.g., the IoT device 608) coupled to the first processing device, the first device having collected the first data (e.g., at 702) from a first tag (e.g., the tag 606) that is coupled to a first physical object for organizing the first physical object; identifying (e.g., at 706), by the first processing device, a first descriptor associated with the first device; and providing (e.g., at 710), by the first processing device, a message with the first descriptor to a second processing device (e.g., the processing device 604) configured for presenting the first descriptor to a user as an indication to a location of the first physical object.

Figure 8:
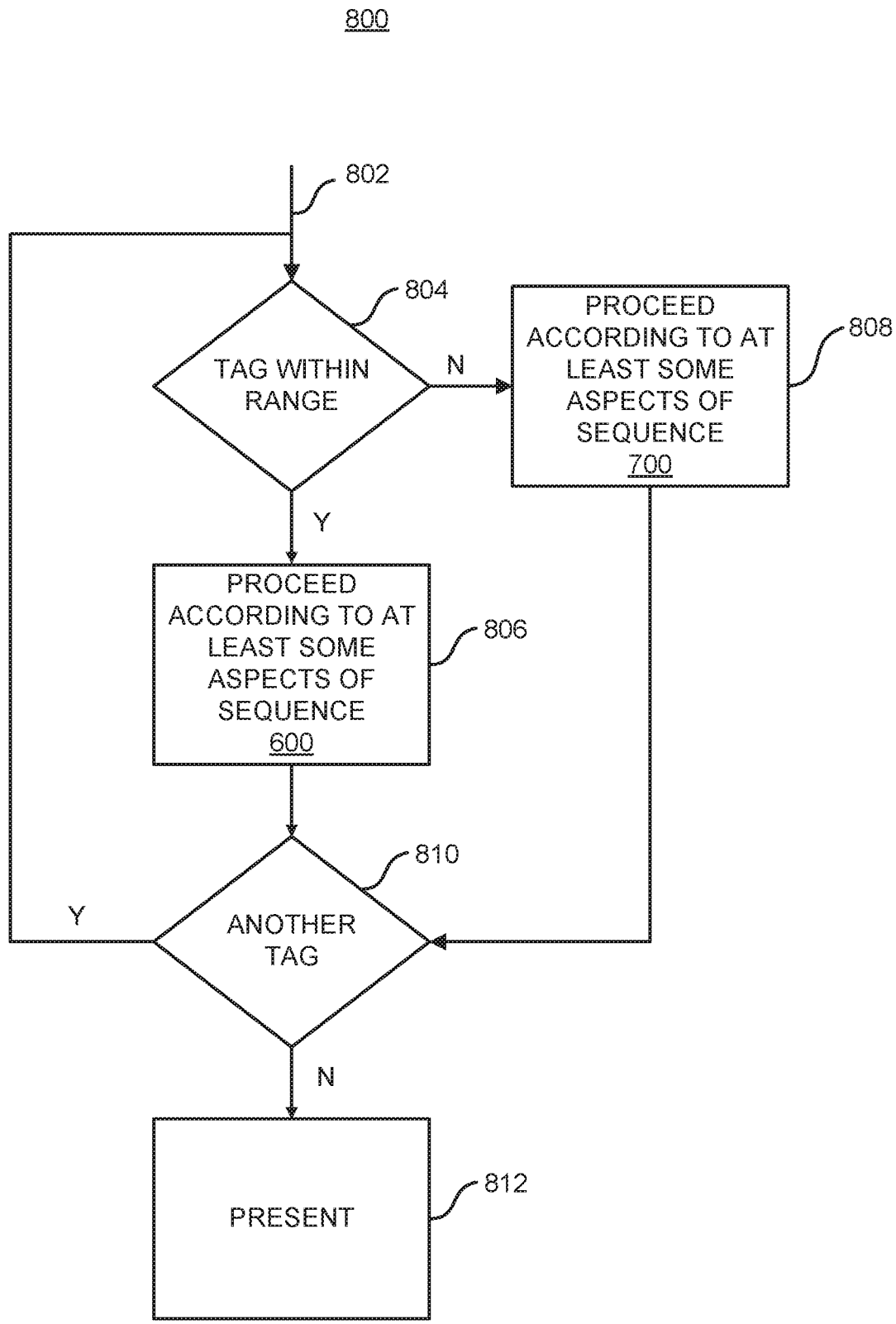
FIG. 8 shows an example flowchart of a method for presenting a descriptor as an indication to a location of a physical object.

FIG. 8 shows an example flowchart of a method 800 for presenting one or more descriptors as an indication to a location of a physical object. The method 800 can be used with one or more other examples described elsewhere herein. The method 800 can be performed using one or more examples described with reference to FIG. 15. In some implementations, the method 800 can be performed by way of at least one processor executing instructions stored in a computer-readable medium. For example, the activity component 205 (FIG. 2) or the activity component 304 (FIG. 3) can perform the method 800. More or fewer operations than shown can be performed. Two or more operations can be performed in another order unless otherwise indicated.

The method 800 can begin at 802. In some implementations, a processing device such as the processing device 108 in FIG. 1) performs the method 800 periodically, randomly, or in response to a specified condition (e.g., a user input, or the presence or absence of a particular signal).

At 804, it can be determined whether a specific tag is within range of a processing device to which the tag is coupled. In some implementations, the determination may involve checking if the tag appears in a current table of detected devices stored in memory on the processing device, or a broadcast message may be transmitted to see if at least the specific tag responds. For example, in FIG. 5 the tag 516 is within range of the processing device 520 when the wireless connection 524 exists. Accordingly one or more operations may be performed to effectuate the determination at 804.

When it is determined at 804 that the specific tag is within range of the processing device (i.e., "Y" at 804), then at 806 the method 800 can proceed according to at least some aspects of the sequence 600 in FIG. 6. For example, this can involve the processing device sending a message instructing the tag to collect data from one or more nearby IoT devices, the tag providing a response message with such data to the processing device, and the processing device obtaining at least one descriptor (e.g., a friendly name) relating to the IoT device(s).

When it is determined at 804 that the specific tag is not within range of the processing device (i.e., "N" at 804), then at 808 the method 800 can proceed according to at least some aspects of the sequence 700 in FIG. 7. This can involve a processing device such as the processing device 510 in FIG. 5 receiving a message with data from at least one IoT device coupled to that processing device. The IoT device may have collected such data from the specific tag mentioned above. A descriptor associated with the IoT device can be identified, and the descriptor(s) can be provided (e.g., to the processing device 520 in FIG. 5).

After either 806 or 808, it can be determined at 810 whether another tag is to be processed. If another tag is to be processed (i.e., "Y" at 810), then the method 800 can return to 804. If no other tag is to be processed (i.e., "N" at 810), then at 812 the descriptor(s) can be presented to a user. For example, the descriptor(s) can be presented in a user interface as an indication to a location of the respective physical object to which the specific tag is coupled. That is, when the processing device 520 in FIG. 5 is to provide indications for locations of multiple physical objects, then for at least one of the physical objects the sequence 600 (or a part thereof) is performed (e.g., such that the processing device 520 looks up the friendly name for an IoT device that the tag of the physical object reports as being nearby), and for at least another one of the physical objects (some of) the sequence 700 (or a part thereof) is performed (e.g., such that the processing device 520 queries the processing device 510 as to whether any of its IoT devices have detected the tag of the physical object).

FIGS. 9A-B show examples of graphical user interface (GUI) 900 that can be used for providing one or more indications to a location of a physical object. The GUI 900 can be used with one or more other examples described elsewhere herein. The GUI 900 can be operated according to using one or more examples described with reference to FIG. 15. In some implementations, the GUI 900 can be generated by way of at least one processor executing instructions stored in a computer-readable medium. The GUI 900 can be presented on a display 902 of a processing device 904 (e.g., the processing device 108 in FIG. 1). A GUI is merely one example of a user interface that can be used. For example, audio input (e.g., by way of voice commands) and/or output (e.g., by way of synthesized speech) may additionally or instead be used. As another example, a visual output (e.g., illuminating a light on the tag) may be made.

The GUI 900 includes a tag area 906 that can be presented on some or all of the display 902. The tag area 906 may present content and facilitate input into the processing device 904 using one or more input controls. Here, a heading 908 in the tag area 906 informs the user that the tag area 906 relates to physical objects (e.g., belongings of the user). Multiple specific physical objects that have been provided with tags can be identified. Here, an entry 910A corresponds to one physical object and an entry 910B corresponds to another physical object. Using the input control, the user has here selected the entry 910A. For example, the selection can trigger the processing device 904 present an indication to the tag's location that the processing device 904 has already proactively performed before the user's input. As another example, the selection can trigger the processing device 904 to perform the attempt to locate and present to the user the indication(s) determined in the location attempt.

The GUI 900 includes a descriptor area 912 where one or more indications to the location of a physical object may be presented. FIG. 9B shows that the tag area 906 shows the highlighted entry 910A to inform the user that this is the physical object for which the indication(s) will be presented. The descriptor area 912 provides the indication using one or more descriptors. Here, the descriptor area 912 indicates that the physical object corresponding to the entry 910A "Is located in the garage."

The phrase "the garage" is here a descriptor 914 that has been identified based on data. For example, an IoT device can have data associated with it that can be correlated with the description "in the garage" (e.g., because such IoT device has been defined as being located in the garage). In some implementations, any of a variety of descriptors can be used, such as friendly names for one or more of a location, an object, or a person. For example, when another tag that is attached to a hockey bag serves as the point of reference, then the descriptor 914 can include "the hockey bag."

In some implementations, some devices may have areas associated with them (e.g., dynamically or statically) such that one or more descriptors associated with the physical location can be provided. For example, a smart lightbulb may be statically associated with "Garage" (unless and until the smart lightbulb is moved to a new location other than the garage). A bag, on the other hand, may dynamically be associated with an area or not at all. In some implementations, a descriptor may correspond to a statically defined space or location such as a garage. In some implementations, a descriptor may be a dynamical label such as a bag, another tag or item, or a person. In some implementations, the descriptor may be at least one of both. For example, the descriptor may be a car or a moving vehicle. If the indication were to say "it is in your Honda CRV" or "within Container X" in a freight transportation example, this could mean within the confines of the vehicle or container, but the container is then related to another location clue (within the garage or not).

A preposition 916 presented in the descriptor area 912 can be selected based at least in part on the descriptor 914. For example, when the descriptor 914 is the name of a place or an area, the preposition 916 can include terms such as in, on, under, or by. As another example, when the descriptor 914 is the name of a physical object, the preposition 916 can include a word such as by, at, or with. As another example, when the descriptor 914 is the name of a person (e.g., when that person's mobile device has been used in determining the tag's location), the preposition 916 can include a term such as by, with, or together with. In some implementations, the preposition 916 can be selected based at least in part on the determined proximity between the tag and the point of reference. For example, if the tag is determined to be relatively close to the point of reference, then the preposition 916 can include a term that indicates close proximity, including, but not limited to, with or by. As another example, if the nearest point of reference happens to be relatively far from the tag, then the preposition 916 can include a term that indicates less proximity, including, but not limited to, near, around, or somewhere by.

The GUI 900 can include an input control 918 that allows the user to select at least one other tag, and obtain the indication(s) for the other tag(s). For example, activation of the input control 918 can cause the processing device 904 to render the tag area 906 similar to its appearance in FIG. 9A.

The software run by the processing device 904 in this example illustrates a computer program product stored in a non-transitory medium and including instructions that when executed cause a processor to generate a GUI (e.g., the GUI 900). The GUI can include a tag area (e.g., the tag area 906) having at least one input control (e.g., at the entry 910A or 910B) configured for a user to select a tag to be located, the tag coupled to a first physical object for organizing the physical object; and a descriptor area (e.g., the descriptor area 912) configured to present a descriptor (e.g., the descriptor 914) having been obtained using data obtained from the tag, the descriptor presented (e.g., as shown in FIG. 9B) as an indication to locating the physical object.

Some examples described here may involve receiving data provided from a single source (e.g., a tag such as the tag 516 in FIG. 5, or a device, such as the smart lightbulb 506 in FIG. 5 (or another IoT device)), and presenting at least one descriptor as an indication to the location of the corresponding physical object. As described in examples, the single source may have obtained the data (which may be any form of data, including, but not limited to, metadata such as a descriptor) from another entity in an environment. In other implementations, data may be received from more than one source and be used for at least one purpose, for example as described below.

Figure 10:
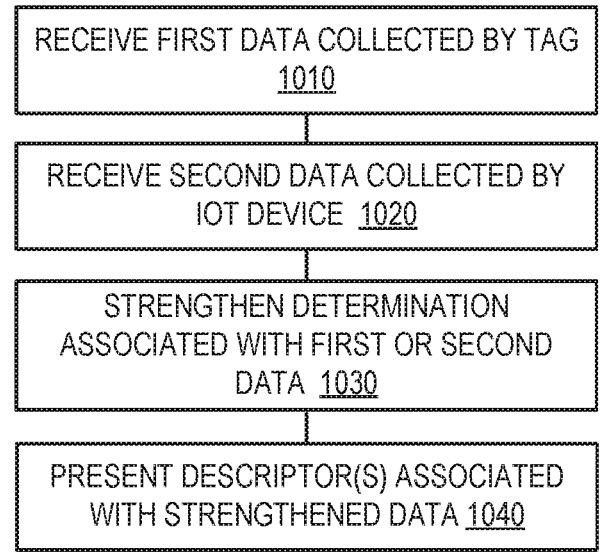
FIG. 10 shows an example flowchart of a method for confirming at least one indication to a location of a physical object.

FIG. 10 shows an example flowchart of a method 1000 for confirming at least one indication to a location of a physical object. The method 1000 can be used with one or more other examples described elsewhere herein. The method 1000 can be performed using one or more examples described with reference to FIG. 15. In some implementations, the method 1000 can be performed by way of at least one processor executing instructions stored in a computer-readable medium. For example, the activity component 205 (FIG. 2) or the activity component 304 (FIG. 3) can perform the method 1000. More or fewer operations than shown can be performed. Two or more operations can be performed in another order unless otherwise indicated.

At 1010, first data collected by at least one tag may be received in a first message. In some implementations, the processing device 520 (FIG. 5) receives the first message with the first data, from the tag 516. For example, the tag 516 may have collected the data from the smart lightbulb 506 (or another IoT device).

At 1020, second data collected by at least one IoT device may be received in a second message. In some implementations, the processing device 520 (FIG. 5) may receive the second message with the second data, which may have been originally collected by the smart lightbulb 506 (or another IoT device). For example, the processing device 510 may receive the data from the smart lightbulb 506 (or another IoT device) and forward at least some of the data as the second data to the processing device 520.

At 1030, at least one determination associated with the first or second data may be strengthened based on the other(s) of the first or second data. In some implementations, the first data comprises an indication that the physical device is at a first location, and the second data comprises an indication that the physical device is at a second location. When there is at least some overlap between the first and second locations, the indication that the physical object is at the second location may serve to strengthen the indication that the physical object is at the first location, and vice versa. For example, either of the indications provided by the descriptors "in the garage" and "in the toolbox" may strengthen (e.g., tend to make more reliable or plausible, or confirm) the other. In some implementations, the strengthening(s) may be done after identifying the descriptor(s) associated with the respective first and second data. In the implementation shown in FIG. 5, the strengthening of the determination(s) may be performed by at least one of the processing devices 510 or 520, to name just two examples.

At 1040, the descriptor(s) associated with the strengthened data may be presented. In some implementations, the descriptor(s) may be presented by the processing device 520 (FIG. 5) using visual and/or audio output. For example, when the location associated with the first data is strengthened using the second data, the descriptor(s) associated with the first data may be output to a user. As another example, when the location associated with the second data is strengthened using the first data, the descriptor(s) associated with the second data may be output to a user.

Figure 11:
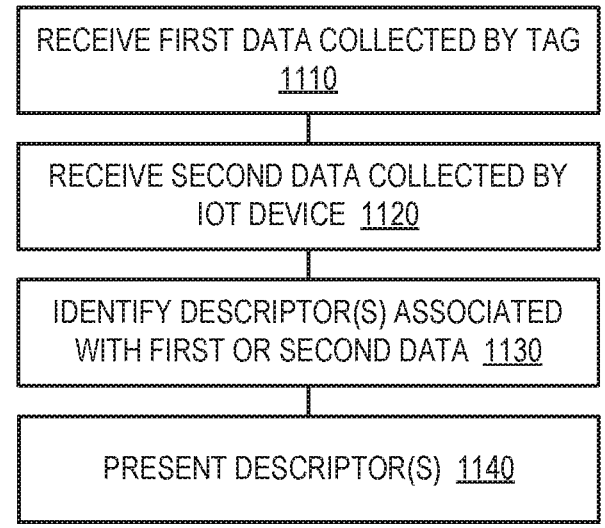
FIG. 11 shows an example flowchart of a method for presenting one or more indications to a location of a physical object.

FIG. 11 shows an example flowchart of a method 1100 for presenting one or more indications to a location of a physical object. The method 1100 can be used with one or more other examples described elsewhere herein. The method 1100 can be performed using one or more examples described with reference to FIG. 15. In some implementations, the method 1100 can be performed by way of at least one processor executing instructions stored in a computer-readable medium. For example, the activity component 205 (FIG. 2) or the activity component 304 (FIG. 3) can perform the method 1100. More or fewer operations than shown can be performed. Two or more operations can be performed in another order unless otherwise indicated.

At 1110, first data collected by at least one tag may be received. In some implementations, this may be performed substantially as described with reference to FIG. 10 (e.g., at 1010).

At 1120, second data collected by at least one IoT device may be received. In some implementations, this may be performed substantially as described with reference to FIG. 10 (e.g., at 1020).

At 1130, the descriptor(s) associated with the first or second data may be identified. In some implementations, the identification may be performed by at least one of the processing devices 510 or 520, to name just two examples. For example, the descriptors "in the garage" may be determined based on the first data and "in the toolbox" may be determined based on the second data.

At 1140, the descriptor(s) may be presented. In some implementations, descriptors that were identified based on data received from more than one source may be presented. For example, the descriptors "in the garage" and "in the toolbox" may both be presented. In some implementations, presentations of multiple descriptors may provide the user increased indication(s) as to a possible location of a physical object. For example, basing the identification of the descriptors on data obtained from separate sources (e.g., both the tag(s) and the IoT device(s)) may give the user a more reliable or robust clue or hint to the location.

Figure 12:
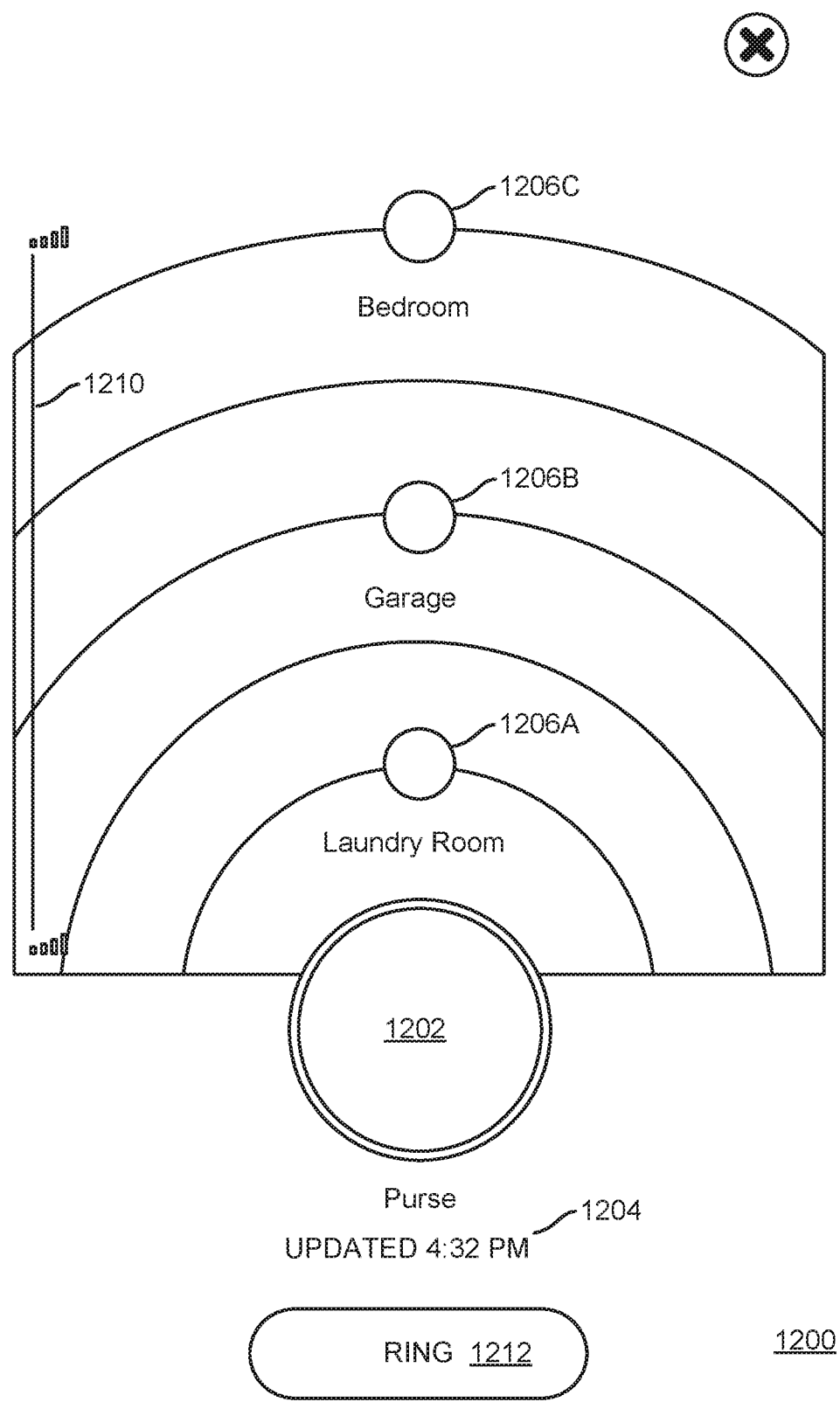
FIGS. 12-13 show examples of GUIs that may be used for presenting one or more indications to a location of a physical object.
Figure 13:
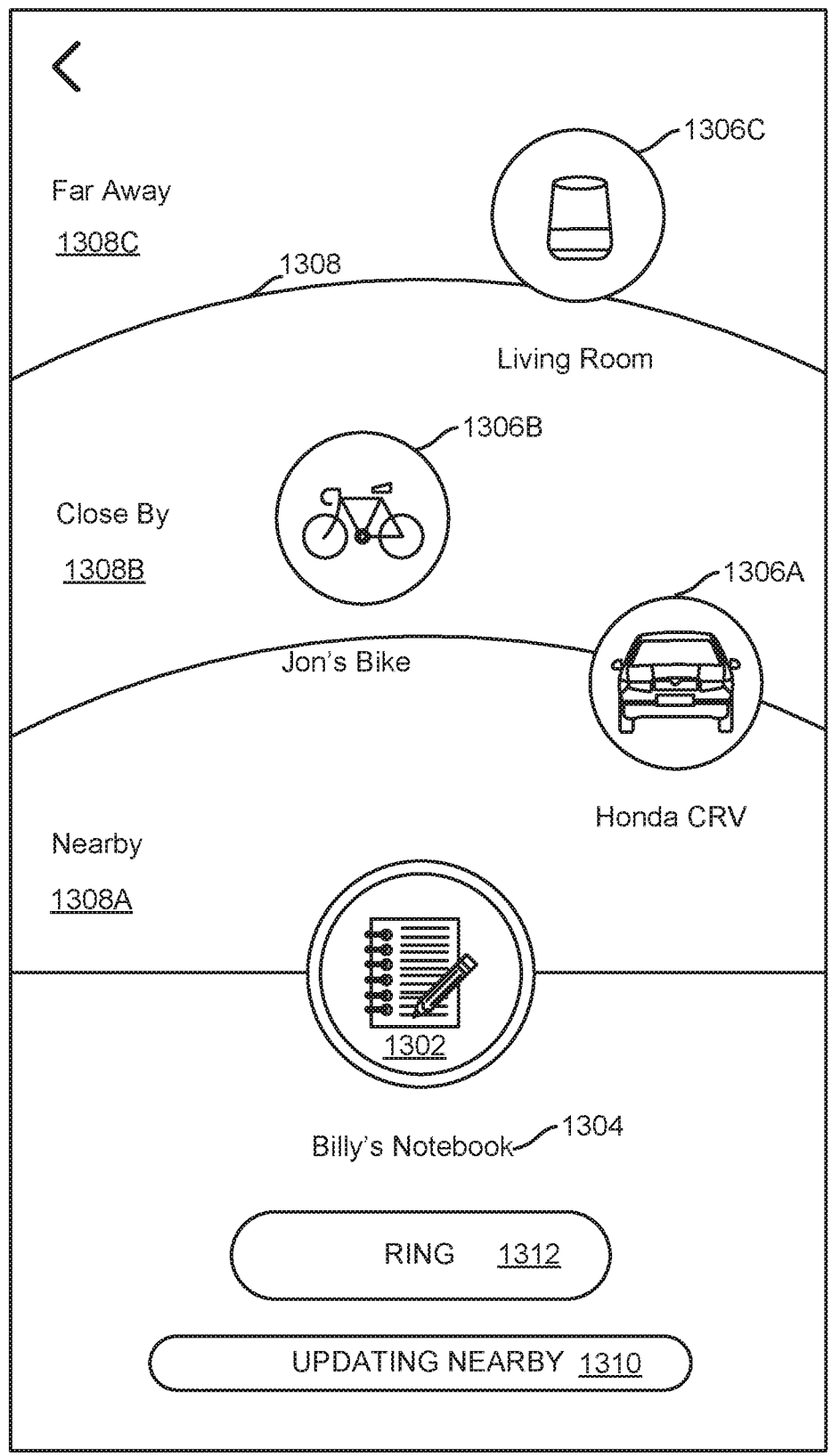

FIGS. 12-13 show examples of GUIs 1200 and 1300 that may be used for presenting one or more indications to a location of a physical object. The GUIs 1200 and/or 1300 may be used with one or more other examples described elsewhere herein. The GUIs 1200 and/or 1300 may be generated using one or more examples described with reference to FIG. 15. In some implementations, the GUIs 1200 and/or 1300 may be generated by way of at least one processor executing instructions stored in a computer-readable medium. For example, the activity component 205 (FIG. 2) or the activity component 304 (FIG. 3) can generate the GUIs 1200 and/or 1300.

The GUI 1200 may include a symbol 1202 representing a physical object associated with a particular tag (e.g., the tag 102 and/or one of the tags 104A-C in FIG. 1). In some implementations, an identifier 1204 may provide a plain-language name associated with the tag, the name having been selected based on, for example, the physical object. Here, the identifier 1204 states "Purse". Accordingly, the GUI 1200 may be providing one or more indications to a user as to the location of a purse.

The GUI 1200 may be updated to present one or more descriptors 1206A-C associated with the tag of the symbol 1202. Here, the descriptor 1206A is labeled "Laundry Room", the descriptor 1206B is labeled "Garage", and the descriptor 1206C is labeled "Bedroom". The descriptors 1206A-C may have been identified based on data from one or more sources. In some implementations, one or more of the descriptors 1206A-C is based on data collected by the tag associated with the symbol 1202. For example, the tag may have collected such data from one or more devices (e.g., an IoT device) near the tag. In some implementations, one or more of the descriptors 1206A-C is based on data collected by a device other than the tag associated with the symbol 1202. For example, one or more IoT devices and/or processing devices may receive data from the tag (e.g., based on a beacon signal from the tag) and report that data to a processing device.

The GUI 1200 may indicate an approximate proximity of any or all of the devices associated with the descriptors 1206A-C. In some implementations, one or more contours 1208 may be presented in the GUI 1200. The contour(s) 1208 may provide the user additional indication as to the location of the physical object by depicting the one(s) of the descriptors 1206A-B closer to the tag, and the one(s) of the descriptors 1206A-B farther from the tag. For example, the descriptors 1206A-B may correspond to a hierarchy based on determined or estimated proximity. One or more scales or other standards may be presented in the GUI 1200. Here a scale 1210 schematically indicates proximity regarding the descriptors 1206A-C.

The user may be able to derive indications relevant to location from the descriptors 1206A-C. The GUI 1200 in this illustration may relate to a house where the garage and a family room are on opposite sides of the laundry room. The laundry room (e.g., the descriptor 1206A) is here the most proximate descriptor, and the garage (e.g., the descriptor 1206B) is the second most proximate. The family room, by contrast, is not indicated by any of the descriptors 1206A-C. The user may then assume or guess that the physical object is probably closer to the garage-side of the laundry room than the family-room side. For example, in addition to obtaining indications based on the descriptor(s) 1206A-C that the GUI 1200 presents, the user may also derive some indication based on the known descriptor(s) that the GUI 1200 does not currently present.

The GUI 1200 may facilitate performing one or more operations regarding the tag associated with the symbol 1202. In some implementations, a control 1212 can be actuated to have the tag associated with the symbol 1202 perform an action. For example, the control 1212 may trigger the tag to emit an audible signal (e.g., using the speaker 220 in FIG. 2).

Turning now to the GUI 1300, it similarly includes a symbol 1302 associated with a tag. For example, the symbol 1302 may here be associated with a tag affixed to "Billy's Notebook," as indicated by an identifier 1304. The GUI 1300 may include one or more descriptors 1306A-C. Here, the descriptor 1306A is labeled "Honda CRV" (e.g., a vehicle), the descriptor 1306B is labeled "Jon's Bike" (e.g., a bicycle), and the descriptor 1306C is labeled "Living Room". The descriptors 1306A-C may be arranged in order of estimated proximity. In some implementations, contours 1308 may be included in the GUI 1300. For example, the contours 1308 here define a nearby region 1308A, a close by region 1308B, and a far away region 1308C.

A progress bar 1310 can inform the user of any ongoing update(s) of the information presented in the GUI 1300. In some implementations, the progress bar 1310 may indicate whether any of the regions 1308A-C is being updated. For example, the progress bar 1310 here indicates that the nearby region 1308A is currently being updated.

The GUI 1300 may facilitate performing one or more operations regarding the tag associated with the symbol 1302. In some implementations, a control 1312 can be actuated to have the tag associated with the symbol 1302 perform an action. For example, the control 1312 may trigger the tag to emit an audible signal (e.g., using the speaker 220 in FIG. 2).

Figure 14:
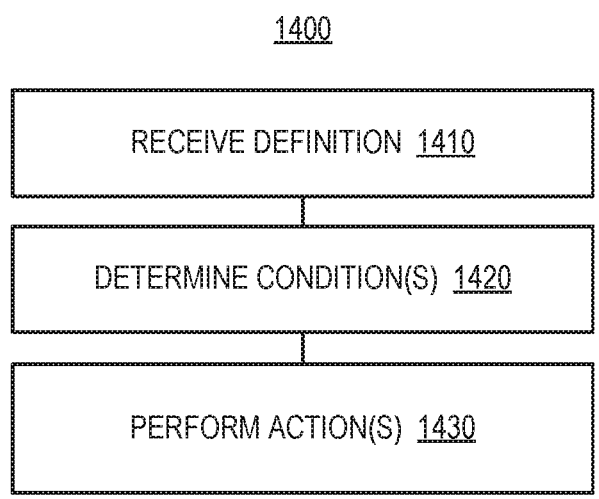
FIG. 14 shows an example flowchart of a method for a tag to act upon making a specific determination.

FIG. 14 shows an example flowchart of a method 1400 for a tag to act upon making a specific determination. The method 1400 can be used with one or more other examples described elsewhere herein. The method 1400 can be performed using one or more examples described with reference to FIG. 15. In some implementations, the method 1400 can be performed by way of at least one processor executing instructions stored in a computer-readable medium. For example, the activity component 205 (FIG. 2) or the activity component 304 (FIG. 3) can perform the method 1400. More or fewer operations than shown can be performed. Two or more operations can be performed in another order unless otherwise indicated.

At 1410, a tag may receive (e.g., from the processing device 108 in FIG. 1) at least one definition relating to when the tag should or should not take one or more specific actions. The definition may be received by the tag 102 and/or at least one of the tags 104A-C in FIG. 1, by the tag 200 in FIG. 2, by one or more of the tags 422, 428, 432, 442, 444, and 450 in FIG. 4, by the tag 516 in FIG. 5, and/or by the tag 606 in FIG. 6.

In some implementations, the definition relates to a location of the tag. The location may be determined based on the other device(s) that the tag may or may not be able to detect at its present position. For example, the definition may specify that the tag should be at a predefined location (e.g., should be able to detect one or more specific devices). As another example, the definition may specify that the tag should not be at a predefined location (e.g., should not be able to detect one or more specific devices).

In some implementations, the definition relates to a circumstance facing the tag. The circumstance may be determined based on an output of one or more sensors on the tag. For example, the definition may specify that the sensor(s) should make a particular output. As another example, the definition may specify that the sensor(s) should not make a particular output.

At 1420, the tag may determine one or more conditions that are currently present, or not present, for the tag. In some implementations, the determination may be performed based on the presence and/or absence of the specific communication signal(s) from at least one other device. In some implementations, the determination may be performed based on the presence and/or absence of the specific output(s) from at least one sensor of the tag.

At 1430, the tag may perform one or more actions in response to the determination at 1420. In some implementations, performing the action(s) may involve taking one or more positive measures. For example, the tag may send a message and/or make a predefined output (e.g., visually and/or audibly). In some implementations, performing the action(s) may involve inhibiting, or abstaining from taking, an action or measure that would have occurred but for the determination at 1420. For example, the tag may cease sending predefined messages and/or cease making predefined outputs.

Figure 15:
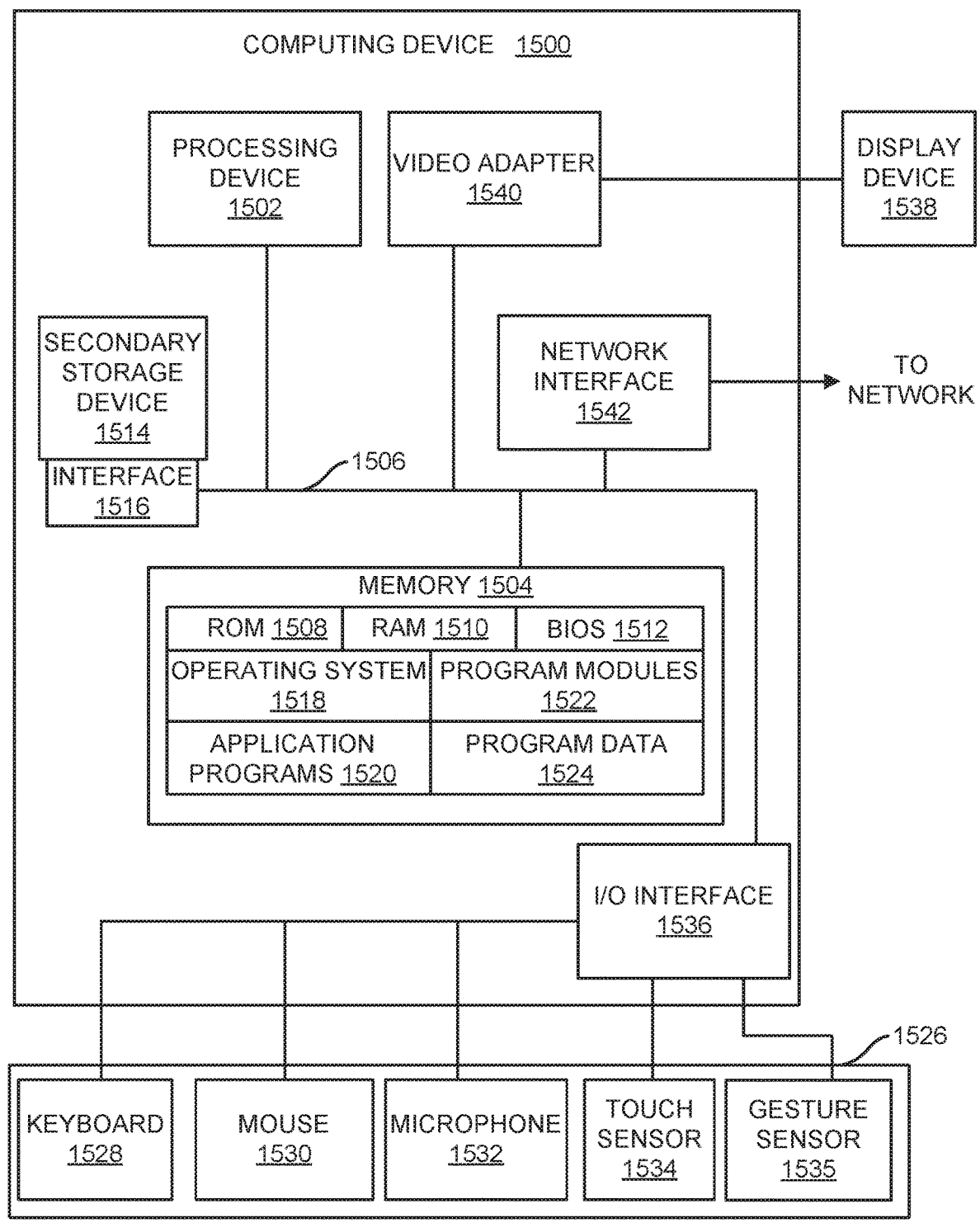
FIG. 15 shows an example of a computer device that can be used to implement the techniques described here.

FIG. 15 illustrates an example architecture of a computing device 1500 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 15 can be used to execute the operating system, application programs, and/or software modules (including the software engines) described herein.

The computing device 1500 includes, in some embodiments, at least one processing device 1502 (e.g., a processor), such as a central processing unit (CPU). A variety of processing devices are available from a variety of manufacturers, for example, Intel or Advanced Micro Devices. In this example, the computing device 1500 also includes a system memory 1504, and a system bus 1506 that couples various system components including the system memory 1504 to the processing device 1502. The system bus 1506 is one of any number of types of bus structures that can be used, including, but not limited to, a memory bus, or memory controller; a peripheral bus; and a local bus using any of a variety of bus architectures.

Examples of computing devices that can be implemented using the computing device 1500 include a desktop computer, a laptop computer, a tablet computer, a mobile computing device (such as a smart phone, a touchpad mobile digital device, or other mobile devices), or other devices configured to process digital instructions.

The system memory 1504 includes read only memory 1508 and random access memory 1510. A basic input/output system 1512 containing the basic routines that act to transfer information within computing device 1500, such as during start up, can be stored in the read only memory 1508.

The computing device 1500 also includes a secondary storage device 1514 in some embodiments, such as a hard disk drive, for storing digital data. The secondary storage device 1514 is connected to the system bus 1506 by a secondary storage interface 1516. The secondary storage device 1514 and its associated computer readable media provide nonvolatile and non-transitory storage of computer readable instructions (including application programs and program modules), data structures, and other data for the computing device 1500.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 1514 and/or system memory 1504, including an operating system 1518, one or more application programs 1520, other program modules 1522 (such as the software engines described herein), and program data 1524. The computing device 1500 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 1500 through one or more input devices 1526. Examples of input devices 1526 include a keyboard 1528, mouse 1530, microphone 1532 (e.g., for voice and/or other audio input), touch sensor 1534 (such as a touchpad or touch sensitive display), and gesture sensor 1535 (e.g., for gestural input. In some implementations, the input device(s) 1526 provide detection based on presence, proximity, and/or motion. In some implementations, a user may walk into their home, and this may trigger an input into a processing device. For example, the input device(s) 1526 may then facilitate an automated experience for the user. Other embodiments include other input devices 1526. The input devices can be connected to the processing device 1502 through an input/output interface 1536 that is coupled to the system bus 1506. These input devices 1526 can be connected by any number of input/output interfaces, such as a parallel port, serial port, game port, or a universal serial bus. Wireless communication between input devices 1526 and the input/output interface 1536 is possible as well, and includes infrared, BLUETOOTH® wireless technology, 802.11 a/b/g/n, cellular, ultra-wideband (UWB), ZigBee, or other radio frequency communication systems in some possible embodiments, to name just a few examples.

In this example embodiment, a display device 1538, such as a monitor, liquid crystal display device, projector, or touch sensitive display device, is also connected to the system bus 1506 via an interface, such as a video adapter 1540. In addition to the display device 1538, the computing device 1500 can include various other peripheral devices (not shown), such as speakers or a printer.

The computing device 1500 can be connected to one or more networks through a network interface 1542. The network interface 1542 can provide for wired and/or wireless communication. In some implementations, the network interface 1542 can include one or more antennas for transmitting and/or receiving wireless signals. When used in a local area networking environment or a wide area networking environment (such as the Internet), the network interface 1542 can include an Ethernet interface. Other possible embodiments use other communication devices. For example, some embodiments of the computing device 1500 include a modem for communicating across the network.

The computing device 1500 can include at least some form of computer readable media. Computer readable media includes any available media that can be accessed by the computing device 1500. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1500.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 15 is also an example of programmable electronics, which may include one or more such computing devices, and when multiple computing devices are included, such computing devices can be coupled together with a suitable data communication network so as to collectively perform the various functions, methods, or operations disclosed herein.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   determining, by a first processing device, whether a first tag is within range of the first processing device;
   in response to determining that the first tag is within the range of the first processing device:
   sending, by the first processing device, a first message including an instruction to the first tag to collect first data from at least one device, the first tag coupled to a first physical object for organizing the first physical object;
   receiving, by the first processing device, a second message from the first tag, the second message including the first data;
   sending, by the first processing device, a first request to a second processing device configured to monitor and control the at least one device, the first request including the first data;
   receiving, by the first processing device, a first response from the second processing device, the first response including a first descriptor as being associated with the first data; and
   presenting, by the first processing device, at least the first descriptor to a user as an indication to a location of the first physical object; and
   in response to determining that the first tag is not within the range of the first processing device:
   sending, by the first processing device and to the second processing device, a second request including an identifier of the first tag;
   receiving, by the first processing device, a second response from the second processing device, the second response including the first descriptor; and
   presenting, by the first processing device, at least the first descriptor to the user as the indication to the location of the first physical object.

2. The method of claim 1, wherein second data is collected from multiple devices by the first tag, the method further comprising selecting, by the first processing device, the first data from the second data.

3. The method of claim 2, wherein the first processing device selects the first data from the second data based on a proximity measure relating to the first tag.

4. The method of claim 1, wherein the device includes a second tag.

5. The method of claim 1, wherein the device includes a smart lightbulb.

6. The method of claim 1, wherein multiple descriptors are presented to the user as the indication to the location of the first physical object.

7. The method of claim 1, further comprising determining, by the first processing device, a proximity metric for a second tag that is within range of the first processing device, wherein determining the proximity metric is based on a received signal strength indication (RSSI), a latency value, a connectivity parameter, and a change in any of the RSSI, the latency value, and the connectivity parameter.

8. A computer program product stored in a non-transitory medium and including instructions that when executed cause a processor to perform operations comprising:
- determining, by a first processing device, whether a first tag is within range of the first processing device;
- in response to determining that the first tag is within the range of the first processing device:
  - sending, by the first processing device, a first message including an instruction to the first tag to collect first data from at least one device, the first tag coupled to a first physical object for organizing the first physical object;
  - receiving, by the first processing device, a second message from the first tag, the second message including the first data;
  - sending, by the first processing device, a first request to a second processing device configured to monitor and control the at least one device, the first request including the first data;
  - receiving, by the first processing device, a first response from the second processing device, the first response including a first descriptor as being associated with the first data; and
  - presenting, by the first processing device, at least the first descriptor to a user as an indication to a location of the first physical object; and
- in response to determining that the first tag is not within the range of the first processing device:
  - sending, by the first processing device and to the second processing device, a second request including an identifier of the first tag;
  - receiving, by the first processing device, a second response from the second processing device, the second response including the first descriptor; and
  - presenting, by the first processing device, at least the first descriptor to the user as the indication to the location of the first physical object.

9. A system comprising:
- a first processing device;
- a device having first data;
- a second processing device configured to monitor and control the device, the second processing device including a first descriptor associated with the first data; and
- a first tag associated with an identifier, the first tag coupled to a first physical object for organizing the first physical object;
- wherein the first processing device is configured to determine whether the first tag is within range of the first processing device, and in response to determining that the first tag is within the range of the first processing device, send a first message including an instruction to the first tag to collect the first data from the device, receive a second message from the first tag, the second message including the first data, send a first request to the second processing device, the first request including the first data, receive a first response from the second processing device, the first response including the first descriptor, and present at least the first descriptor to a user as an indication to a location of the first physical object; and
- wherein the first processing device is further configured to, in response to determining that the first tag is not within the range of the first processing device, send to the second processing device a second request including the identifier, receive a second response from the second processing device, the second response including the first descriptor, and present at least the first descriptor to a user as the indication to the location of the first physical object.

10. The system of claim 9, wherein the device includes a second tag.

11. The system of claim 9, wherein the device includes a smart lightbulb.

12. The system of claim 9, further comprising second tags, wherein the first tag is configured to be a parent tag of each of the second tags, and wherein each of the second tags is configured to be a child tag of the first tag.

13. The system of claim 12, wherein each of the second tags has fewer components than the first tag.

14. The system of claim 12, further comprising a light-emitting diode (LED) included in the first tag, wherein the first tag is configured to indicate, using the LED, a presence or absence of at least one of the second tags.

15. The system of claim 9, further comprising a wired interface included in the first tag.

16. The system of claim 9, wherein the first tag is configured to have an internal awareness pertaining to the first physical object itself, and an external awareness relating to factors externally related to the first physical object.

17. The system of claim 16, wherein the internal awareness comprises at least one preset state value and at least one dynamic state value.

18. The system of claim 17, wherein the preset state value comprises a manufacturer's suggested retail price of the first physical object, or the dynamic state value comprises a market value of the first physical object.

19. The system of claim 16, wherein the first tag includes a sensor, and wherein the external awareness comprises an output of the sensor, the output including a measure of one or more of moisture, humidity, pressure, altitude, wind speed, strain, shear, particle radiation, or compass point direction.

20. The system of claim 9, wherein the first tag has a beaconing pattern and further includes an accelerometer, wherein the first tag is configured to increase the beaconing pattern in response to the accelerometer indicating that the first tag is in motion.

\* \* \* \* \*